June 1, 1965  R. V. DORN ETAL  3,186,890
SEALING AND STAMPING MACHINE
Filed Nov. 16, 1961  13 Sheets-Sheet 1

INVENTORS
RONALD V. DORN
REUBEN R. LOGAN
BY
Wallace, Kinzer & Dorn
Att'ys.

June 1, 1965 R. V. DORN ETAL 3,186,890
SEALING AND STAMPING MACHINE
Filed Nov. 16, 1961 13 Sheets-Sheet 3

INVENTORS
RONALD V. DORN
REUBEN R. LOGAN
BY
Wallace, Kinzer & Dorn
ATTYS.

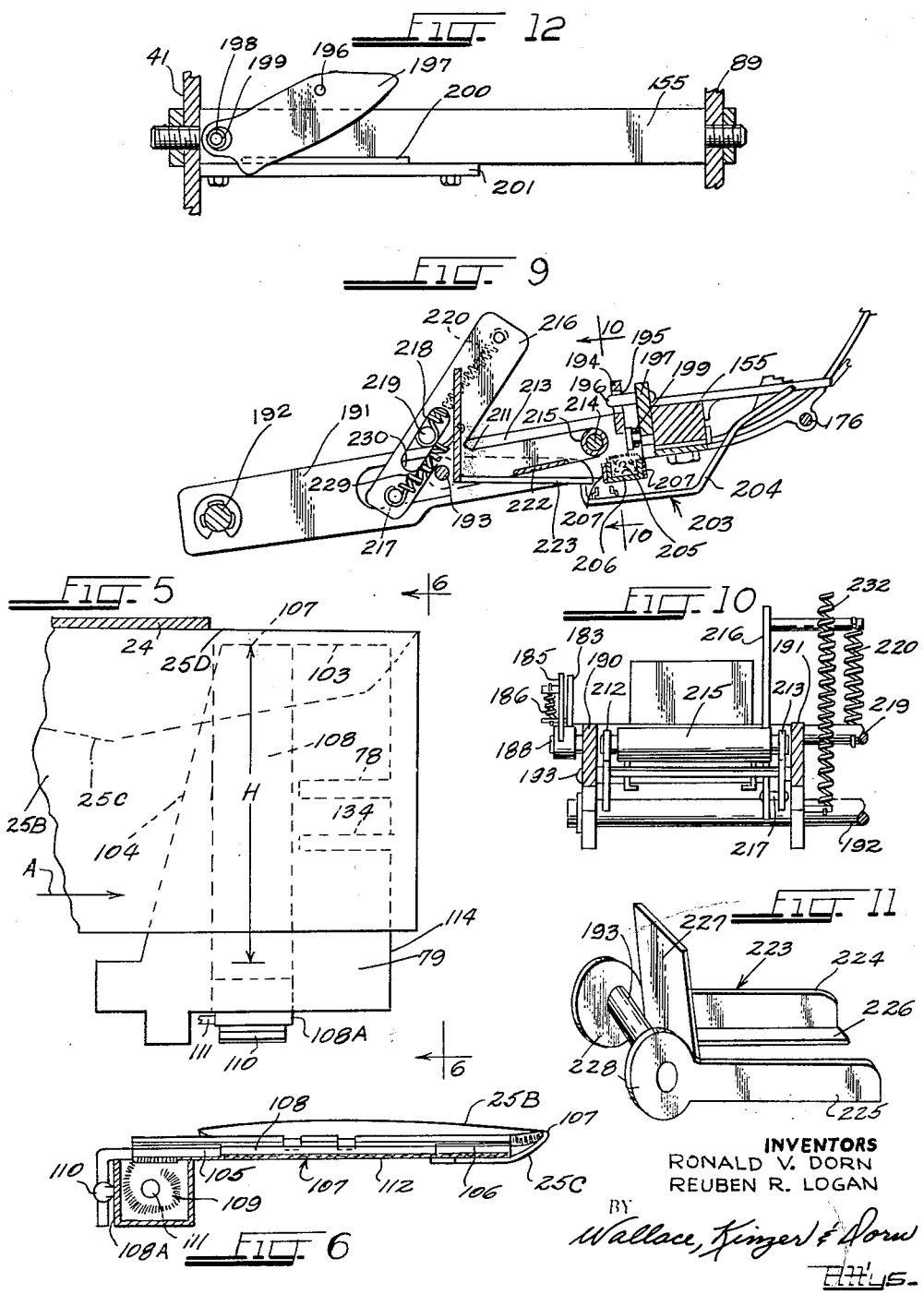

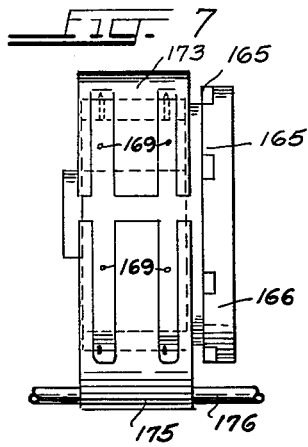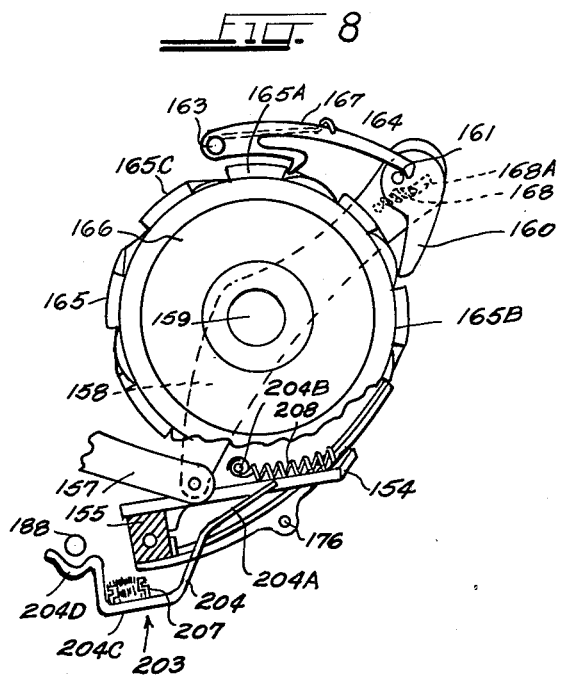

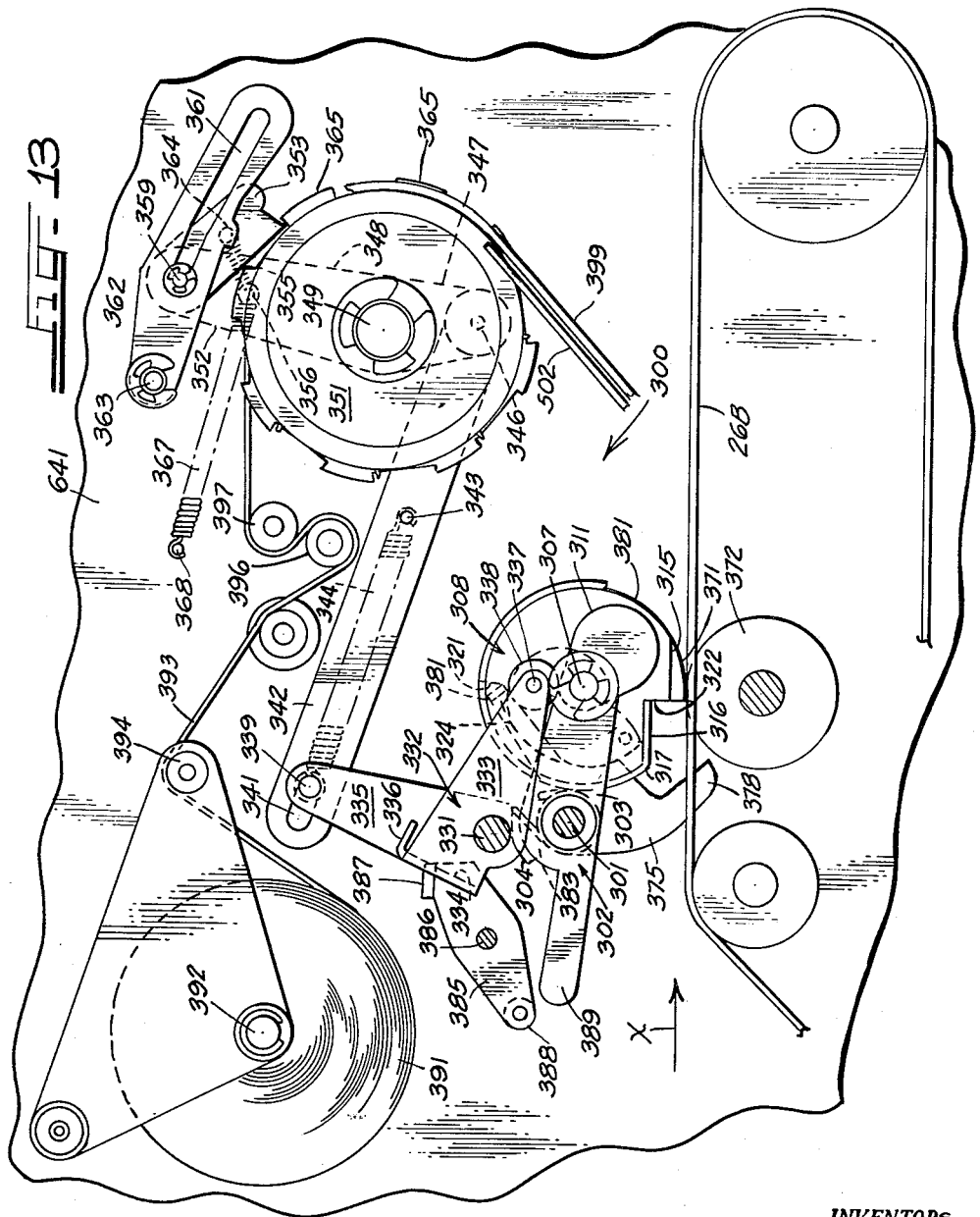

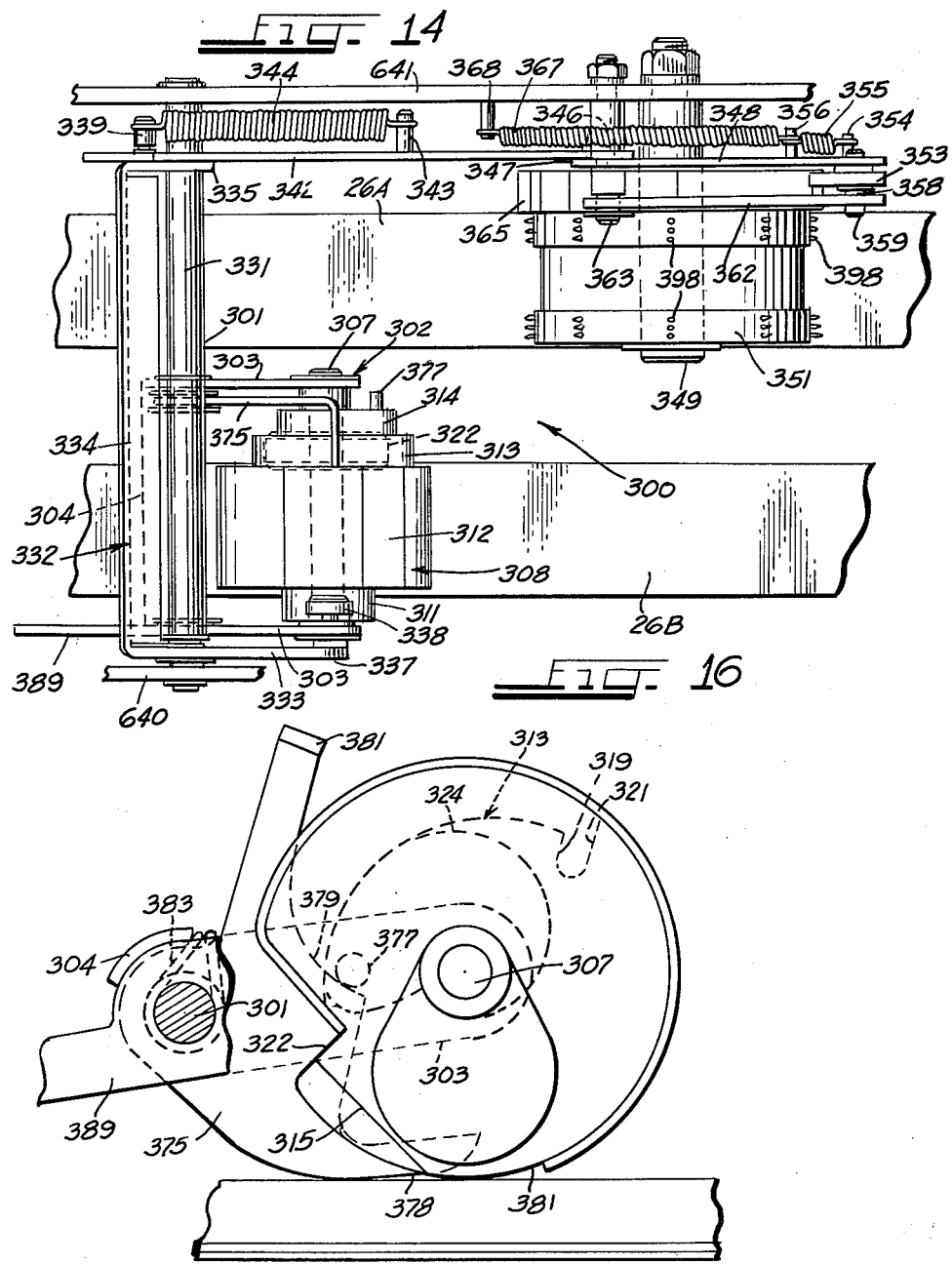

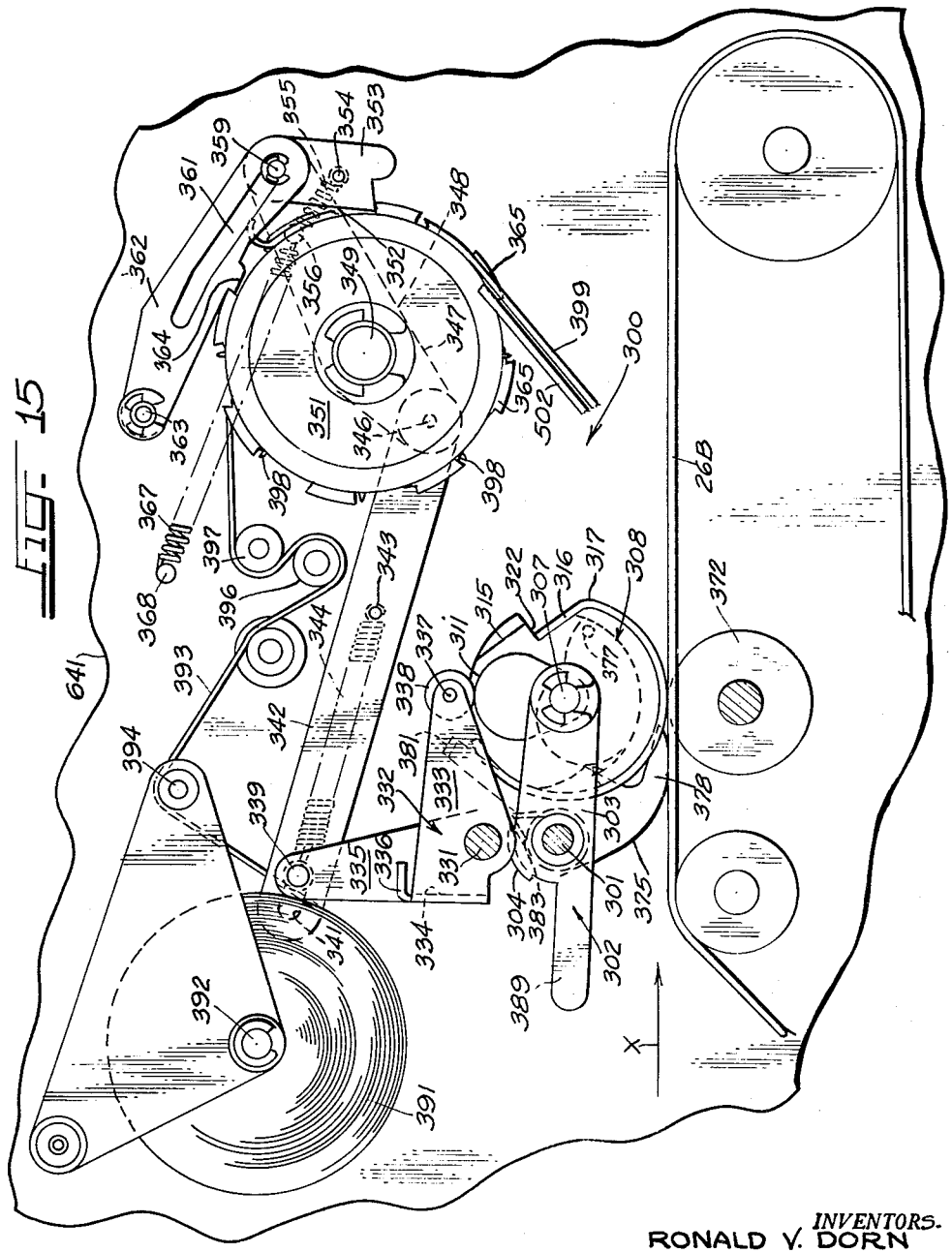

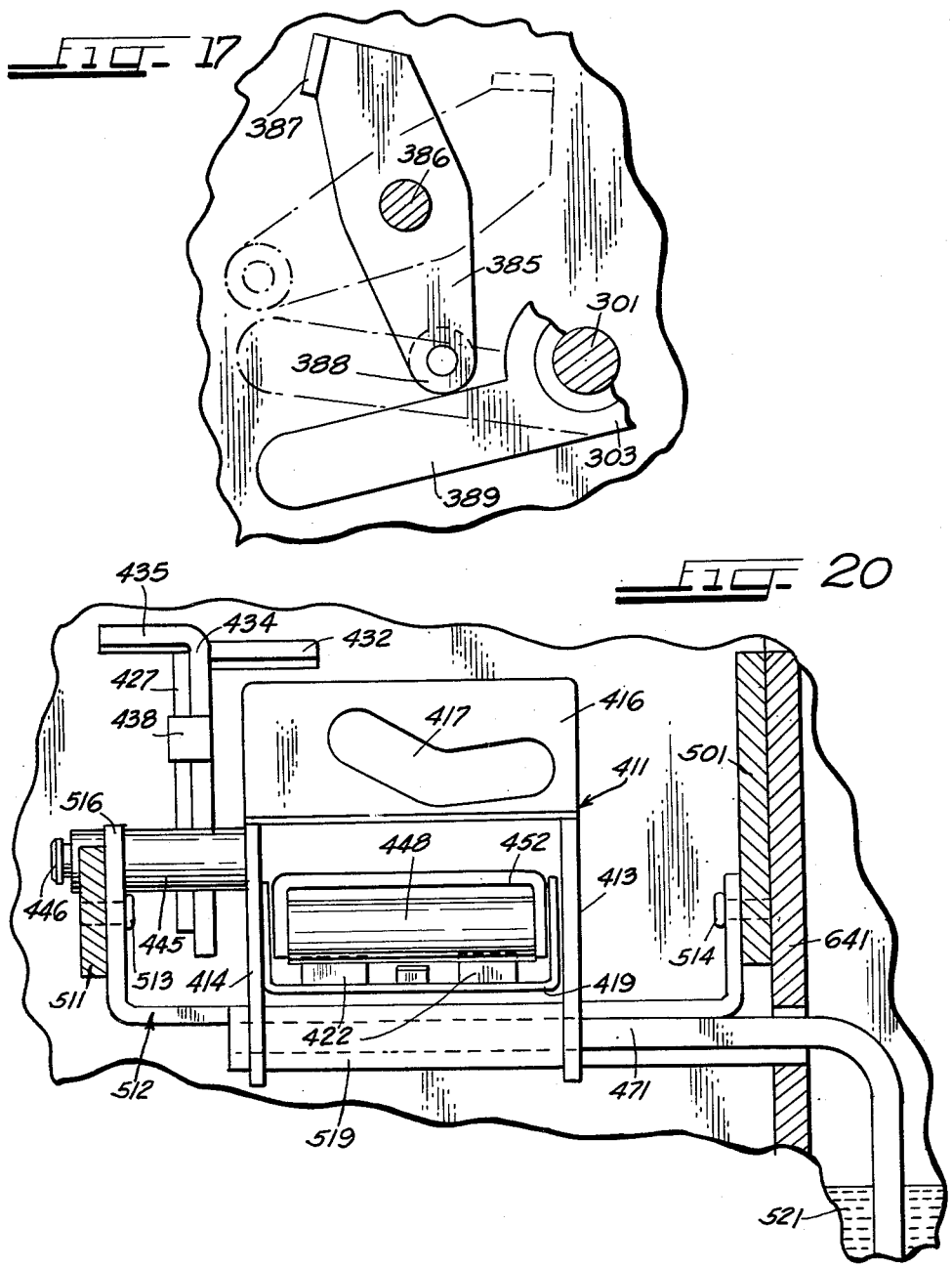

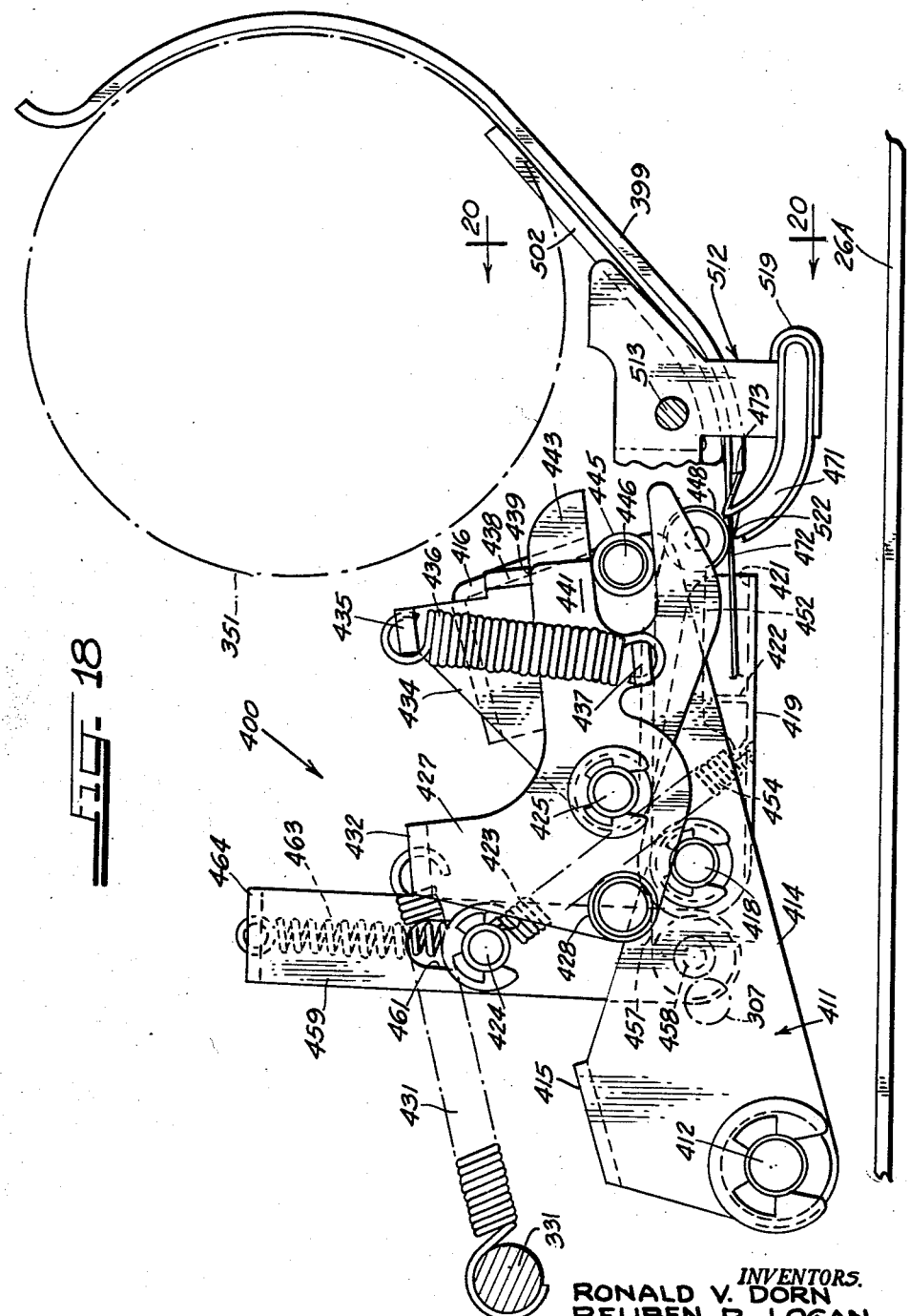

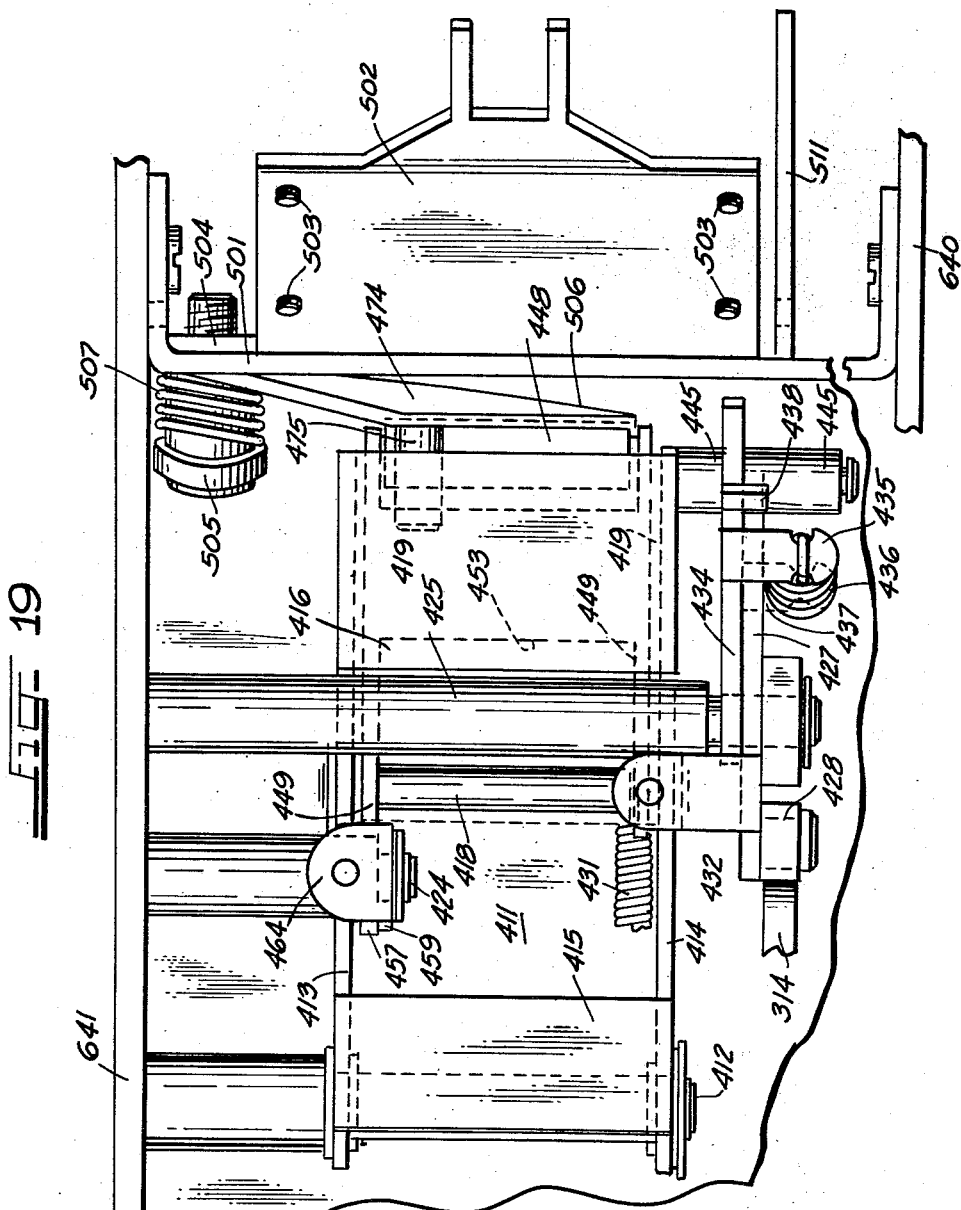

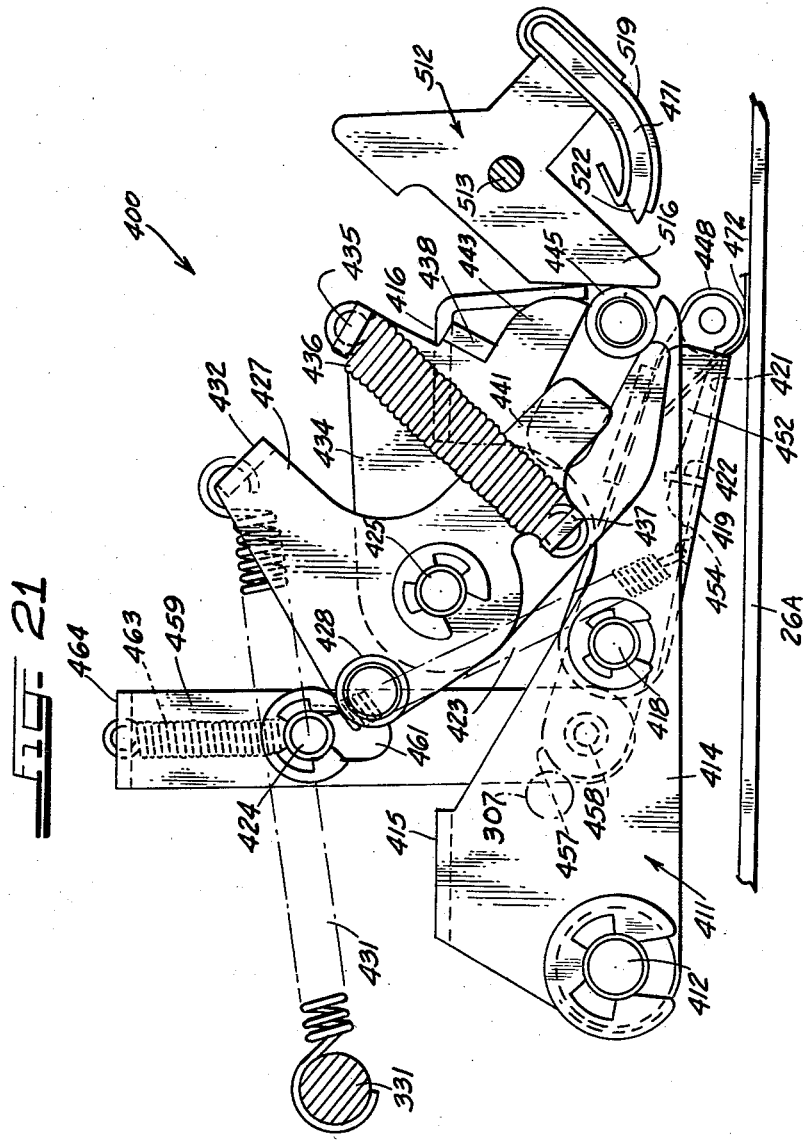

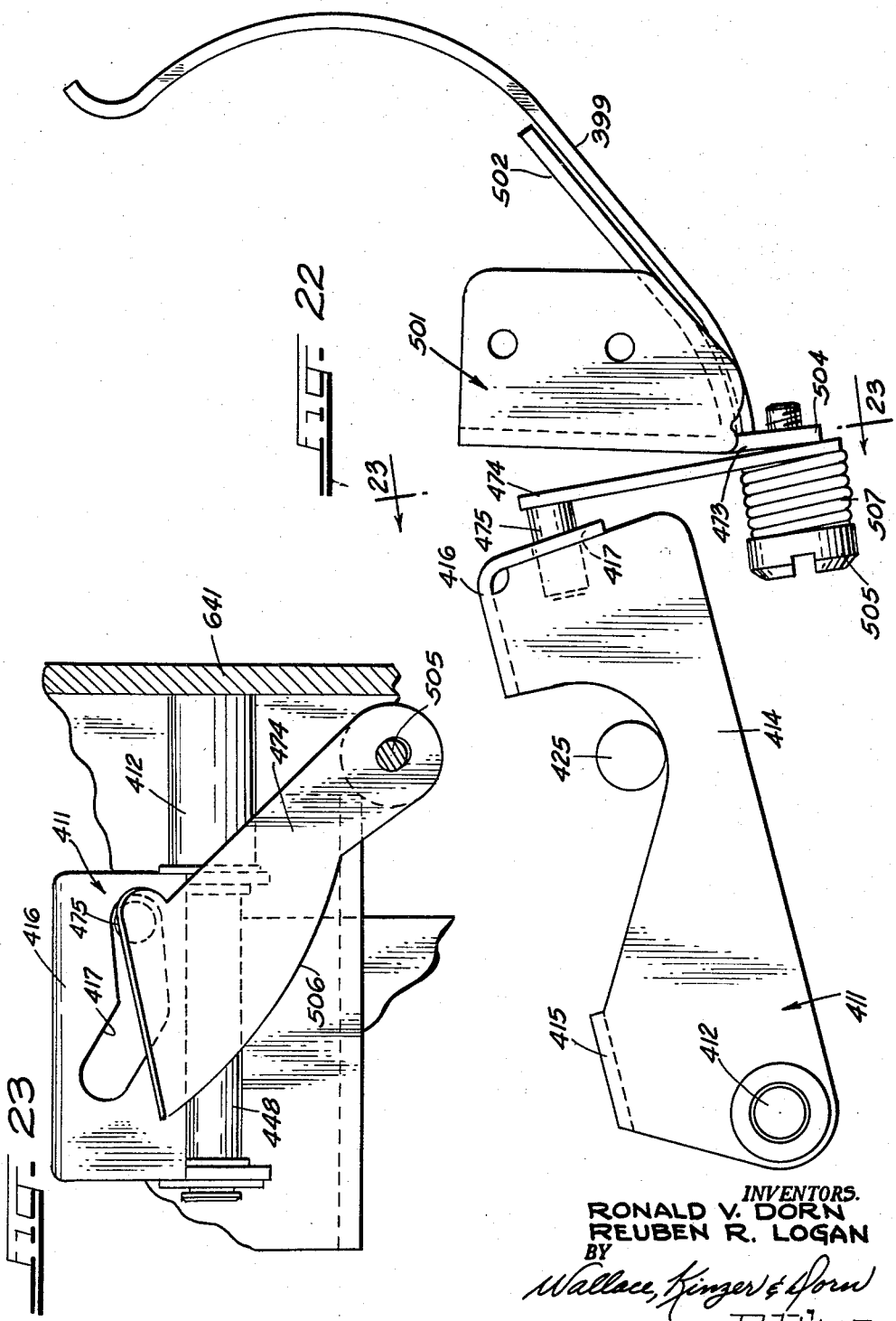

United States Patent Office 3,186,890
Patented June 1, 1965

3,186,890
SEALING AND STAMPING MACHINE
Ronald V. Dorn, 315 14th St. NW., Albuquerque,
N. Mex., and Reuben R. Logan, 4251 Zenith Ave. N.,
Robbinsdale, Minn., assignors of thirty percent to said
Logan and seventy percent to said Dorn
Filed Nov. 16, 1961, Ser. No. 152,859
20 Claims. (Cl. 156—363)

This invention relates to a new and improved mailing machine. More particularly, the invention relates to a new and improved mechanism for applying stamps to envelopes which may be combined with apparatus for sealing envelopes. This application is a continuation-in-part of application Serial No. 667,382, filed June 24, 1957, now abandoned.

One of the oldest and yet most pressing problems in the field of clerical and office operations relates to the time and effort consumed in the sealing of envelopes for mailing and to the application of postage to those envelopes. Indeed, the problems presented in this field are of increasing importance to a constantly growing group of businesses and other offices, since more and more organizations and businesses are utilizing the mails for a wide variety of purposes. To meet this problem, a number of different machines and devices have been proposed in the past. Some machines have been designed solely to apply postage in the form of specially printed labels, others have been designed to print the amount of postage required directly on the envelopes; machines of this type have generally been referred to as postage meters or postage meter imprinters. Some postage meters and imprinters have also been adapted to seal the envelopes in addition to applying postage thereto. Other machines have effected the same general results by utilizing ordinary postage stamps.

The postage meters and imprinters presently available for office use are relatively expensive in construction and operation, and are hence not adapted to the needs of relatively small organizations or business firms which may have a need for a device of this nature only once during each month or at other infrequent intervals rather than on a daily basis. Sealing and stamping machines, on the other hand, which apply postage in the form of conventional stamps, have been even more expensive and complex and have been unable to compete in the present day market with postage metering devices. In general, therefore, it may be clearly stated that there is a definite need for a relatively small, inexpensive, and economical machine for applying conventional postage stamps to envelopes and for sealing the envelopes as a part of the same operation.

It is a primary object of the present invention, therefore, to afford a new and improved mechanism for automatically applying postage stamps to envelopes or other similar mailing material.

It is another object of this invention to afford a new and improved stamping mechanism incorporated in a machine that is also effective to seal envelopes automatically in the course of a mailing or similar operation.

Another object of the invention is the provision of a new and improved mailing machine adapted to seal an envelope and to apply postage to that envelope, or to accomplish either of those objectives independently without requiring substantial modification or adjustment of the machine.

Another object of the invention is the provision of a new and improved stamping mechanism which is relatively small in size and convenient in operation.

An additional object of the invention is a new and improved stamping mechanism which requires a minimum of maintenance and which inherently affords maximum periods of trouble-free operation.

Another object of the invention is the provision of a new and improved stamping mechanism which includes a minimum number of operating parts requiring alignment or adjustment for proper operation of the machine.

A further important object of the invention is a new and improved mechanism for applying postage stamps to envelopes, which is extremely simple and economical in construction, yet which accommodates envelopes of varying length, thickness, and width, and of varying configuration, without change or adjustment.

Another object of the invention is to provide optimum wetting of the adhesive on conventional postage stamps, avoiding excessive or inadequate wetting automatically. A related object of the invention is to afford an improved wetting action that operates directly on the stamp and not on the envelope, yet which is not subject to jamming or other malfunction from excessive accumulation of adhesive at the wetting station.

A particular object of the invention is to afford an accurate stamp feeding, severing, and affixing operation controlled solely by movement of an envelope or other mailing piece through the stamping mechanism.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1A is a rear elevation view of the mailing machine of FIG. 1;

FIG. 5 is a detail plan view of a portion of the envelope sealing mechanism of the mailing machine;

FIG. 6 is a detail view of the envelope sealing mechanism taken along line 6—6 in FIG. 5;

FIG. 7 is a detail view of a part of the stamp-feeding apparatus of the mailing machine;

FIG. 8 is an enlarged elevation view of a portion of the stamp feed and moistener apparatus of the machine;

FIG. 9 is a sectional view of a portion of the stamp affixing mechanism of the mailing machine;

FIG. 10 is a sectional view of the stamp affixing mechanism taken along line 10—10 in FIG. 9;

FIG. 11 is a perspective view showing one part of the stamp affixing mechanism;

FIG. 12 is a detail view of the stamp severing mechanism of the mailing machine of FIG. 1;

FIG. 13 is an elevation view of a stamp feed mechanism constructed in accordance with a preferred embodiment of the invention;

FIG. 14 is a plan view of the stamp feed mechanism of FIG. 13;

FIG. 15 is an elevation view similar to FIG. 13 but with the stamp feed mechanism in a different operating position;

FIG. 16 is a detail view showing an intermediate operating position for the power cam of FIGS. 13 and 15;

FIG. 17 is a detail view of the stamp-by-pass feature of the preferred stamping mechanism;

FIG. 18 is an elevation view of a preferred embodiment of a stamp-affixing mechanism according to the invention;

FIG. 19 is a plan view of the preferred stamp-affixing mechanism;

FIG. 20 is a detail elevation of the stamp wetter, taken approximately along line 20—20 in FIG. 18;

FIG. 21 is an elevation view like FIG. 18 but with the mechanism in a different operating position;

FIG. 22 is a detail elevation view of the stemp-severing apparatus for the mechanism of FIGS. 18–21; and FIG. 23 is a further detail view of the stamp-severing apparatus.

General description

Figure 1:
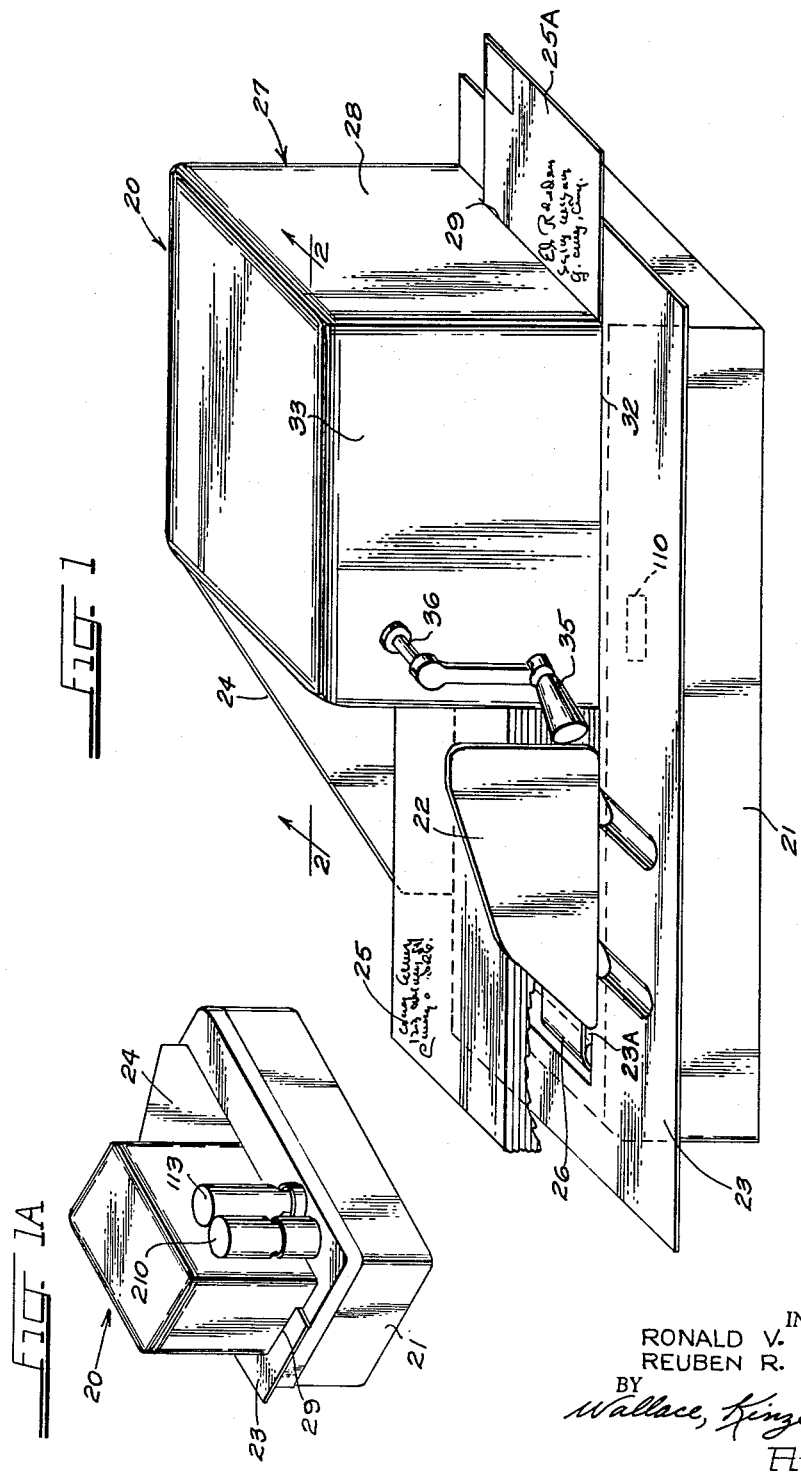
FIG. 1 is a perspective view of a mailing machine constructed in accordance with one embodiment of the invention.

The mailing machine 20 shown in the perspective view of FIG. 1 comprises a base 21 which supports an envelope rack including two vertical guide members 22 and 24. The vertical guide 24 is mounted in a fixed position with respect to base 21, as more clearly shown in the sectional view of FIG. 3, and serves as a primary fixed guide for the envelopes 25 to be processed by the machine. Guide member 22, on the other hand, is adjustably mounted for horizontal movement with respect to the machine base 21 and consequently may be varied in position to accommodate envelopes of different sizes. In this connection, it should be noted that although the guide member 22 affords a convenient means for aligning the stack of envelopes 25 in the machine, it is not essential to the operation of the mailing machine, and may be eliminated if desired.

Figure 2:
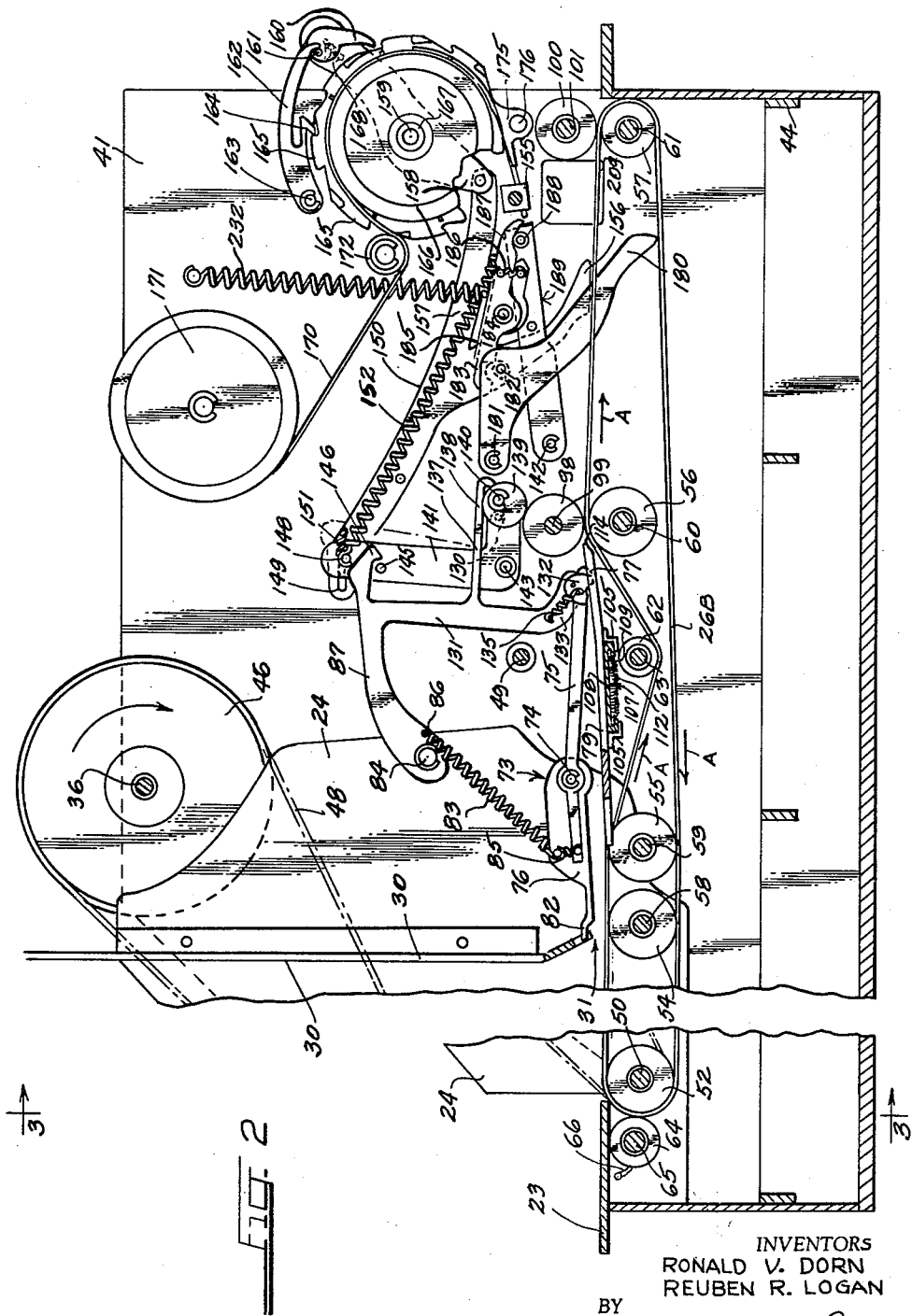
FIG. 2 is a longitudinal section view taken along line 2—2 in FIG. 1.
Figure 3:
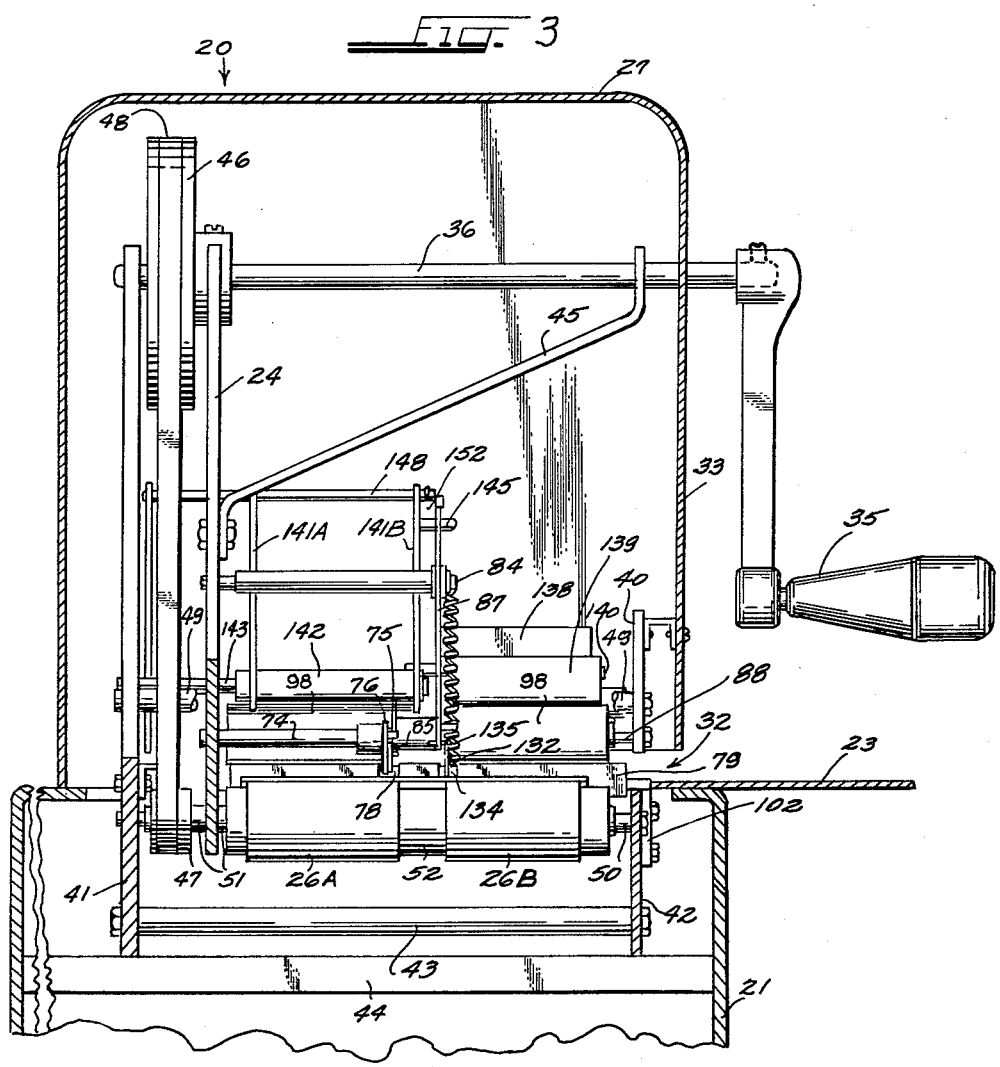
FIG. 3 is a transverse sectional view taken along line 3—3 in FIG. 2.

A platform or table 23, shown in FIGS. 1 and 3, is supported upon the machine base 21 and extends outwardly from three sides of the base. It is this platform which constitutes the principal support member for the stack of envelopes 25. A portion of the envelope stack 25 has been cut away in FIG. 1 to show a conveyor 26 which is mounted within the portion of base 21 underlying the envelope stack. Conveyor 26, which in the illustrated embodiment comprises two conveyor belts 26A and 26B (FIG. 3), is utilized to feed individual envelopes into the operating mechanism housing 27 of the machine. As best shown in FIG. 2, the wall 30 of the housing 27 adjacent the envelope stack 25 terminates above the conveyor belts, affording a gate 31 extending transversely of the conveyor 26 to permit the envelopes to enter the mechanism housing. A section 23A, of the platform 23 extends beneath the conveyor belts, as indicated in FIG. 1, and is utilized as a support member for supporting the vertical guide 22. Any suitable mounting arrangement which permits adjustment of the position of the guide 22 in a horizontal direction, to fit envelopes of varying width, may be employed for this purpose. The opposite wall 28 of the housing 27 affords an aperture 29 through which individual envelopes emerge after they have been sealed and after application of postage thereto, as indicated in FIG. 1 by the envelope 25A. The two apertures 29 and 31 are preferably interconnected by a further aperture 32 at the base of the front wall 33 of the housing 27 so that oversize envelopes may extend partially from the machine during processing; this gap or housing aperture is also clearly indicated in FIG. 3.

The mailing machine 20 is provided with an operating handle 35 mechanically coupled to an operating shaft 36 which extends from housing 27; handle 35 is employed to actuate the sealing and stamping mechanism of the mailing machine 20 as is explained more completely hereinafter. If desired, the machine may be power-operated by means of a small electric motor or other suitable prime mover connected directly to the conveyor mechanism, as explained more fully hereinafter, in which case the handle 35 and operating shaft 36 may be omitted.

The basic mode of operation of the mailing machine 20, insofar as the user is concerned, is simplicity itself. The letters, printed matter, or other material to be mailed out in the envelopes 25 are first inserted in the envelopes, after which the envelopes are stacked in the rack 22, 24 in the position shown in FIG. 1. All the envelopes are oriented similarly with respect to the machine, the fold line or junction between the fold and flap of each envelope extending parallel to the conveyor 26 and abutting the vertical guide member 24. The flaps of the envelopes are in their normal folded position and are disposed beneath the envelopes. Preferably, the lowermost envelope in the stack is advanced a short distance toward the opening or gate 31 in the housing wall 30, usually by a distance of about one quarter of an inch, in order to assure individual feeding of the first envelope into the operating mechanism. It has been found that if this is done there is virtually no tendency for the machine to feed more than one envelope at a time, despite the fact that the thickness of the envelopes may vary substantially with the use of different envelopes and with variations in the amount of printed or written matter or other material inserted therein.

After the envelopes have been loaded in the rack 22, 24, the handle 35 is rotated in a clockwise direction to drive the conveyor 26 and the other operating devices of the machine. The envelopes advance one by one into the housing 27 and are first sealed and then stamped, emerging as indicated by the envelope 25A. No further manual handling of the envelopes is required; they leave the machine virtually ready to be mailed. The moistening of the adhesive on the envelopes and on the stamps is achieved in the machine by automatic application of moisture thereto as described in detail hereinafter; the entire operation is automatic and requires only a minimum of attention from the machine operator. Since commonly used moistenable adhesives require some time to "set up," a few minutes delay may be desirable, after envelopes leave the machine, before the envelopes are actually mailed.

Envelope feed and envelope spacing

Figure 4:
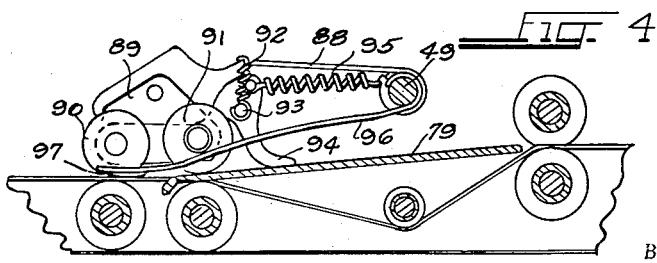
FIG. 4 is a detail sectional view, similar to FIG. 2 but showing a portion of the envelope feeding mechanism not illustrated in FIG. 2.

The basic envelope-feeding and spacing devices of the mailing machine 20 are best shown in the sectional elevation views of FIGS. 2 and 3 and in the detail sectional view of FIG. 4. As indicated therein, the mailing machine includes a frame comprising three vertical frame members 40, 41 and 42. The vertical frame members 41 and 42 are connected and rigidly spaced with respect to each other by a plurality of cross braces 43, and are supported upon a plurality of cross members 44 connecting the sides of the base 21. The vertical frame member 40 is also connected to the frame member 41 and rigidly spaced with respect thereto by a pair of shouldered cross braces as indicated by brace 49 in FIG. 3. The frame of the machine further includes the vertical guide member 24, which is mounted in parallel spaced relation to frame member 41 and which, as indicated hereinabove, serves as the principal guide element in orienting the envelopes for passage through the machine.

The main operating shaft 36 of the mailing machine 20 is journaled in the vertical frame member 41 and is also supported by and journaled in a brace 45 which is affixed to and extends outwardly and upwardly from the vertical guide member 24. A pulley 46 is mounted on shaft 36 at the end thereof adjacent vertical frame member 41; pulley 46 comprises the drive pulley of the machine and is connected in mechanical driving relationship to a conveyor pulley 47 as by means of a drive belt 48. The drive belt 48 may comprise a conventional round or V-type belt or may even comprise a drive chain; preferably, however, the drive belt is of the serrated type conventionally known as a gear belt or timing belt, in which case corresponding gear-type pulleys are utilized as members 46 and 47.

The driven pulley 47 is journaled on a first conveyor shaft 50, being affixed to a sleeve or bearing member 51 which extends for the major portion of the length of shaft 50 and which comprises a journal bearing for a conveyor roller 52. Sleeve 51 may be fabricated from metal or other material suitable for this purpose but preferably is formed of a fluor-carbon resin, since this type of material is capable of extended service without requiring lubrication. Alternatively, the sleeve 51 may comprise a steel, brass or other metal tube with a fluorcarbon liner, to achieve the desired self-lubricating properties. The conveyor roller 52 may be fabricated from hard rubber or any other suitable material.

As indicated in FIGS. 2 and 3, roller 52 engages and supports the conveyor belts 26A and 26B which together constitute the conveyor 26 of the mailing machine. These conveyor belts preferably extend throughout the entire length of the mailing machine and are engaged by and supported on a further series of idler rollers 54, 55, 56 and 57. Idler rollers 56 and 57 may be essentially similar in construction to the roller 52. Idler rollers 54 and 55 may comprise steel rollers. Rollers 54, 55, 56 and 57 are journaled upon a series of stationary shafts 58, 59, 60 and 61 respectively which extend between the vertical frame members 41 and 42. Because none of these shafts is required to rotate, they provide an additional effective means for accurately spacing the vertical frame members 41 and 42 with respect to each other and consequently are highly useful in obtaining the rigidity and stability desired in the machine.

The conveyor belts 26A and 26B are also engaged by another idler roller 62 journaled on a stationary shaft 63 and by a pressure roller 64 which is journaled on a stationary shaft 65. The shafts 63 and 65 afford further bracing for the machine frame. Roller 62, which is somewhat smaller than but otherwise similar in construction to the rollers 52, 54 and 57, is utilized to deflect the conveyor belts downwardly away from the envelopes as the envelopes traverse the sealing portion of the machine, as described hereinafter. Pressure roller 64, on the other hand, serves a different purpose; this pressure roller is biased at each end as by the springs 66, into pressure contact with the surfaces of the conveyor belts as they engage drive roller 52. Thus, the roller 64 assures continuous driving contact between the drive roller and the belts.

An envelope spacer 73 is mounted within the housing 27 adjacent the inlet opening 31 and is supported up a stub shaft 74 affixed to the vertical guide or frame member 24. The envelope spacer includes an actuating arm 75 and a gate arm 76, both of which are journaled upon the stub shaft 74. The actuating arm 75 extends inwardly of the housing 27 in a direction parallel to the conveyor 26 and terminates in a follower 77 which is normally seated in a slot 78 in an inclined ramp 79. Ramp 79 extends from a location closely adjacent the inlet slot or gate 31 inwardly through the central portion of the sealing-stamping mechanism. The gate arm 76, on the other hand, extends toward the inlet gate 31 in the housing wall 30 and terminates in a blocking portion 82 which, in the normal position shown in FIG. 2, is located substantially above the surface of the conveyor 26. The gate arm 76 is normally maintained in the position shown in FIG. 2 by a spring 83 which extends between the gate arm and a pin 86. The pin 86 is affixed to a cam lever 87 journaled upon a stub shaft 84, the shaft 84 being affixed to and extending outwardly from the vertical frame member 24. The actuating arm 75, on the other hand, is normally biased toward its initial or inactive position, as illustrated in FIG. 2, by means of a biasing spring 85 which interconnects the two operating arms of the envelope spacer.

The envelope guiding and controlling mechanism shown in the detail sectional view of FIG. 4 is also incorporated in the mailing machine 20, being located closely adjacent the envelope spacer 73. This envelope control mechanism comprises a support member 88 pivotally supported upon the cross brace and extending rearwardly therefrom toward the inlet aperture 31. A guide roller mounting member 89 is freely pivotally mounted upon the support 88 at the end thereof adjacent the gate 31 and serves as a support for a pair of guide rollers 90 and 91. The guide roller assembly comprising members 88–91 is biased downwardly by means of a spring 92 which extends between the support member 88 and a stub shaft 93 affixed to the vertical frame member 24.

A shoe 94 is pivotally mounted upon the stub shaft 93 and is biased downwardly toward the ramp 79 by a spring 95 which extends between the shoe and the cross brace 49. This shoe 94 is utilized in the sealing operation of the machine to assure separation of the flap of each envelope from the body portion thereof, as is explained more fully hereinafter. In addition, an arm 96 is pivotally mounted upon the cross brace 49 and extends from the cross brace toward the conveyor, being biased downwardly by a torsion spring (not shown) mounted on the cross brace. Preferably, the arm 96 is provided with a rubber foot 97 on the underside of its leading edge. The foot 97 is preferably held out of contact with the conveyor, the spacing between the conveyor belt and the foot being of the order of 0.01 inch.

When the mailing machine is placed in operation by clockwise rotation of shaft 36, the driving system comprising pulleys 46 and 47, belt 48, and drive roller 52 operates to move the two conveyor belts 26A and 26B in the direction indicated by arrows A in FIG. 2. Movement of the conveyor advances the first or lowermost of the envelopes 25 from the stack, through the inlet gate 31 and underneath the foot 97 of arm 96, then between the rollers 90, 91 and the conveyor belt 26A. The envelope continues its forward movement underneath the blocking portion 82 of the gate arm 76 (FIG. 2). Movement of the envelope is effected by the traction afforded by conveyor belts 26A and 26B, which is sufficient to pass the first or lowermost envelope under the foot 97 of the arm 96.

As the forward movement of the first envelope continues, it advances up the ramp 79 and contacts the shoe 94, which prevents the body of the envelope from buckling. Thereafter, the envelope contacts the follower 77, forcing the follower upwardly and consequently rotating the actuating arm 75 in a counterclockwise direction about the stub shaft 74. This counterclockwise rotational movement of the actuating arm tends to move the gate arm 76 through a corresponding angle, due to the connection between the spacer arms 75 and 76 afforded by the spring 85, thereby forcing arm 76 down against the upper surface of the envelope.

As long as the first envelope is located beneath the blocking element 82, the second envelope is prevented from advancing by the rubber foot 97 on the arm 96. The yieldable connection between the two operating arms 75 and 76 of the envelope spacer afforded by spring 85 permits relative movement between the two arms and therefore allows the envelope to continue its forward movement without damaging or jamming the envelope. As soon as the trailing edge of the first envelope clears the blocking element 82, the blocking element is free to move downwardly to prevent the second envelope from advancing as it is released by the rubber foot 97. Thus, under the biasing effect of the spring 85, the gate arm 76 pivots downwardly to bring the blocking element 82 into a position below the conveyor belts and in contact with the leading edge of the advancing second envelope. Consequently, the second envelope cannot advance further into the machine until the blocking element 82 is again elevated to its normal or unactuated position.

As soon as the trailing edge of the first envelope is disengaged from the follower 77, the envelope spacer returns from its actuated position to the normal or home position shown in FIG. 2, the impetus for the return movement being provided by the spring 83. The clockwise movement of the two operating arms of the envelope spacer raises the blocking element 82 to its normal or home position, permitting the advance of the second envelope. Accordingly, subsequent envelopes are each spaced from the preceding envelope by a substantial distance as the envelopes proceed through the machine, the actual spacing between envelopes being determined by the distance separating the gate element 82 from the follower element 77 of the envelope spacer. This series of operational steps is of course repeated as the envelopes are fed one by one into the machine by conveyor 26, effectively preventing jamming or other malfunction of the mailing machine which might otherwise result if the envelopes were permitted to follow each other in closely adjacent or abutting relationship.

As the envelope is further driven up ramp 79 by conveyor 26 it passes between the roller 56 and a pressure idler roller 98. The roller 98 is journaled upon a shaft 99 located immediately above the shaft 60. The shaft 99 is supported by the vertical frame members 41 and 40. Further forward movement of the envelope passes it between the final set of rollers, the conveyor roller 57 and an idler pressure roller 100. Idler pressure roller 100 is journaled upon a shaft 101 located immediately above shaft 61; the shaft 101 is supported by the vertical frame members 41 and 40. The pressure roller 98 is preferably made sectional in form as is explained more fully hereinafter. The rollers 98 and 100 are biased downwardly, at each end, toward the conveyor rollers 56 and 57 with which they are respectively associated to afford rolling pressure contact at these two separate points, thereby assuring the seal of the flap and the adhesion of the stamp to the envelope; any suitable spring or other resilient biasing means may be employed to achieve the desired effect.

*The envelope sealer*

The envelope sealer mechanism of the mailing machine 20 may best be understood by reference to FIGS. 2, 3, 5 and 6. The envelope sealer comprises the subject of a related co-pending application, Serial No. 152,852, filed concurrently herewith, now Patent No. 3,168,428. As indicated in FIG. 3, the inclined ramp 79 is of cantilever construction and is supported by means of an extension 102 affixed to the vertical support member 42 as by bolts or otherwise suitable means. The ramp extends transversely of the path of the envelope movement within the machine and terminates short of the vertical guide member 24 as indicated in FIG. 5. Thus, a clearance space is afforded between the edge 103 of the ramp 79 and the fold line 25D of an envelope 25B as the envelope advances through the sealer portion of the machine.

The configuration of the ramp 79 is such as to afford a leading or envelope flap-engaging edge 104 which extends across the machine at an acute angle to the perpendicular to the direction of envelope movement, indicated in FIG. 5 by arrow A. This leading edge 104 of ramp 79 is made relatively thin, since it is utilized to separate the envelope flap 25C from the body of the envelope 25B during the initial portion of the sealing operation.

The effective height H of the leading edge 104 is preferably made long enough to exceed the height of the flap on any envelope to be processed in the machine, although this is not essential.

A first pair of brackets 105 are mounted beneath the ramp 79 adjacent the central portion thereof; a similar pair of brackets 106 are mounted beneath the ramp in alignment with the brackets 105 at the opposite side of the ramp. Brackets 105 and 106 are utilized to support a moistener 107 immediately below the ramp 79. The moistener 107 comprises a metal cartridge 108 which partially encompasses a wick member 109, the lower surface 112 of the wick member 109 being exposed beneath the ramp 79 in position to contact the gummed surface of the envelope flap 25C. The wick member 109 extends beyond the cartridge member 108 into an auxiliary reservoir 108A which may be an integral part of the cartridge 108. A handle 110 is affixed to the reservoir 108A for insertion or removal of the cartridge. A flexible inlet tube 111 is connected to an inlet opening in the reservoir 108A and serves as part of a water conduit which extends across the machine to a water reservoir 113 mounted on the left-hand side of the machine upon the base 21; see FIG. 1A. The choice of wicking for member 109 is not critical, since the wick is required to raise water from the auxiliary reservoir 108A through only a relatively short distance; the wick may, for example, be fabricated from ordinary cotton felt or any other suitable wicking material. Where space permits, the reservoir 108A may be enlarged to afford substantial water storage, in which case the reservoir 113 and connecting conduit 111 may be eliminated.

Before the machine is placed in operation, the reservoir is filled with water and the water is drawn up into the wick 109 by capillary action in the usual manner, thereby moistening the wick. In some instances, it may be desirable to pre-moisten the upper part of the wick member 109 before the machine is first placed in operation, although this is not essential. As an envelope is advanced through the machine in the direction indicated by arrows A in FIGS. 2 and 5, it encounters the leading or blade edge 104 of ramp 79. The blade 104 deflects the envelope flap 25C downwardly away from the body of the envelope as best indicated in FIG. 5. Consequently, the adhesive coated upper surface of the envelope flap brushes against the lower surface 112 of the wick member 109 and is moistened by water drawn into the wick from the auxiliary reservoir 108A. Preferably, only a fractional portion of the envelope flap is separated from the envelope body at any given time; as a consequence, the flap is not deflected from the envelope body through a distance sufficient to cause it to miss contact with the wick. The separation angle between the envelope body and flap is relatively small, thereby avoiding any difficulty in bringing the flap and envelope body back together in sealing relationship.

As the leading edge of the envelope 25B advances beyond the trailing edge 114 of ramp 79, it is caught between the conveyor belts and the upper pressure roller 98 at a point immediately above the conveyor roller 56. Since the roller 98 is biased into pressure contact with the conveyor roller 56 at this point, the body and flap portions of the envelope are pressed together, thereby sealing the moistened flap to the envelope body. In many instances, the rolling pressure afforded at this part of the machine would be sufficient to complete the sealing operation. With some envelope adhesives, however, the initial pressure afforded by the roller 98 is insufficient to complete the sealing operation, since the adhesive may not soften rapidly enough to permit complete sealing immediately after the moistening operation. Effective sealing is assured, however, by the further rolling pressure contact afforded by the subsequent engagement of the envelope by pressure roller 100 which, as indicated in FIG. 2, engages the envelope to press the flap and body portions thereof together a second time as the envelope leaves the machine.

The stamp feed mechanism

The stamp feed mechanism of the mailing machine 20 is best shown in FIGS. 2, 3, 7 and 8. This portion of the machine includes the actuating cam lever 87 which is pivotally mounted upon the shaft 84 and which includes an arm 131 extending downwardly within the machine and terminating at a location just above the trailing edge 114 of ramp 79. A follower member 132 is pivotally mounted on the lower end 133 of arm 131 and extends downwardly through an aperture 134 in the ramp 79 as indicated in FIG. 3. The follower member 132 is biased toward its normal or home position as shown in FIG. 2 by means of a small spring 135 connected to the follower and to the arm 131 of the actuating lever.

A stop member arm 137, is affixed to and extends from arm 131 of the actuating lever 87; stop member arm 137 terminates in a hook portion 138 which engages a pin 130 mounted on an extending rearwardly from an eccentric roller 139. The eccentric 139 engages the pressure roller 98 and is journaled upon a shaft 140, which extends cantilever fashion from a bell crank yoke 141. The yoke 141, as best shown in FIG. 3, comprises two similar bell crank members, 141A and 141B, interconnected by a sleeve 142 which also serves as a bearing member for pivotally supporting the bell crank structure upon a stub shaft 143. The shaft 143 is supported from the frame member 41. A latch pin 145 extends outwardly from the bell crank member 141B and is engaged by a latch hook 146 comprising a portion of the actuating lever 87. The upper extremities of the two bell crank members 141A and 141B are interconnected by a rod 148 which extends rearwardly of the bell crank member 141A to engage in a slot 149 in a pitman lever 150, the pitman lever 150 being resiliently connected to rod 148 as by a spring 151, see FIG. 2. The bell crank 141 is also biased against counterclockwise pivotal movement by means of a spring 152, which extends from the rod 148 to a cantilever arm 154 affixed to a support bar 155 (see FIG. 8).

One arm 156 of the pitman lever 150 extends downwardly to a position closely adjacent the upper surface of the conveyor belts 26A and 26B. The other arm 157 of the pitman lever is pivotally connected to a lever 158, which in turn is journaled on a shaft 159. A pawl 160 is pivotally supported upon the other end of the lever 158 by means of a pin 161. The pivot pin 161 extends forwardly from the lever 158 through the pawl 160 to engage a pawl lever 162, the pawl lever 162 being pivotally supported on a shaft 163 supported from frame member 41. A pawl element 164 extends downwardly from the pawl lever 162. As indicated in FIG. 8, the pawl 160 is aligned with a series of projections 165 on a stamp feed wheel 166, the stamp feed wheel being journaled upon the shaft 159. The pawl 164 is also aligned with the projections 165 on the stamp feed wheel. A torsion spring 167 is mounted on the shaft 163 and engages the pawl lever 162 to bias the pawl 164 toward engagement with the stamp feed wheel; the biasing spring 167 also serves to maintain the pawl lever 162 in engagement with the pin 161. The pawl 160 is also biased toward engagement with the stamp feed wheel projections 165 by means of a spring 168 connected to a pin 168B mounted on the pawl; the pin 168B extends through an elongated slot 168A in the lever 158 and is affixed to the rear side of the lever 158.

The stamp feed wheel 166, which is shown in detail in FIGS. 7 and 8, includes a plurality of pairs of pins 169 around the peripheral surface thereof which are aligned with the projections 165 and which are utilized to engage the inter-stamp perforations in a strip of stamps 170. As shown in FIG. 2, the stamp strip 170 is fed from a stamp roll 171 under a guide roller 172 and onto the stamp feed wheel 166. The stamp feed wheel 166 should be constructed from a relatively strong but lightweight material, since it must be accelerated and decelerated rapidly during operation of the stamp feed mechanism. Preferably, the stamp feed wheel is made of aluminum, other lightweight metal or nylon; die cast aluminum or molded nylon are preferred. The pins 169 may be formed from steel wire and force fitted into suitable openings drilled into the stamp feed wheel 166.

An upper guide member 173 is pivotally mounted on shaft 163 and is snap clamped at the bottom on a shaft 176, as shown in FIG. 7. Guide member 173 is included in the stamp feed mechanism to maintain the stamps in contact with the peripheral surface of the stamp feed wheel 166 and to keep the stamps in engagement with the pins 169. A lower stamp guide member and chute 175 is supported on the shaft 176 and is utilized to maintain the lower portion of the stamp strip in contact with the stamp feed wheel 166. A stamp separator arm 202 is mounted on the support member 155 and extends upwardly therefrom into contact with the stamp feed wheel 166, being located intermediate the stamp feed wheel and guide member 175.

Operation of the stamp feed mechanism is controlled entirely by the movement of the envelope through the mailing machine, so that there is no necessity that the machine be driven at a constant speed. As the envelope traverses the ramp 79, it engages the follower member 132, causing the follower to move in a counterclockwise direction about its pivotal support. This movement of the follower 132 urges the cam lever 87 into counterclockwise pivotal movement about its support shaft 84, thus releasing the latching portion 146 of the cam lever 87 from its engagement with the latch pin 145 and releasing the bell crank yoke 141 for movement about its support shaft 143. As a result, the eccentric 139 is permitted to contact the pressure roller 98. The eccentric roller 139 is brought into engagement with the roller 98 by the contraction of the biasing spring 152, which pulls the bell crank yoke 141 in a clockwise direction about its support shaft 143 to force the eccentric 139 into contact with the pressure roller. The eccentric roller 139, upon contact with the pressure roller 98, is rotated in a clockwise direction about its support shaft 140, thus further pivoting the yoke 141 in a clockwise direction about its support shaft 143. The resilient connection between the bell crank 141 and the pitman member 150 afforded by the biasing spring 151 allows for a variance in the thickness of the individual envelopes passing through the machine, thereby preventing overfeeding or underfeeding of the stamp strip 170. The clockwise movement of the bell crank yoke 141 causes pitman member 150 to move to the right, as seen in FIG. 2, thereby pivoting the lever 158 in a counterclockwise direction about its support shaft 159. This counterclockwise pivotal movement of lever 158 causes the pin 161 to urge the pawl lever 162 upwardly against the biasing force afforded by the spring 167, thereby rotating the pawl lever 162 in a counterclockwise direction about its support shaft 163 and thus releasing the pawl 164 from engagement with the projection 165A on the stamp feed wheel 166.

After the pin 161 has moved through a distance sufficient to release the pawl 164 from engagement with the right-hand side of the projection 165A, the continued counterclockwise rotation of the lever 158 moves the pawl 160 into position for engagement with the left-hand side of the projection 165B on the stamp feed wheel 166. Engagement of the pawl 160 with the stamp feed wheel is effected by the biasing spring 168.

At approximately the time that pawl 160 engages the projection 165B, or shortly thereafter, the continued rotation of the eccentric 139 causes the bell crank 141 to reverse its movement about the support shaft 143; the bell crank yoke then starts to pivot in a counterclockwise direction. As a consequence, the pitman member 150 is moved to the left, as seen in FIG. 2, thereby pivoting the lever 158 about its shaft 159 in a clockwise direction. Clockwise movement of the lever 158 causes a corresponding clockwise movement of the stamp feed wheel 166, since the pawl 160 cannot slip out of engagement with the projection 165B'. As the stamp feed wheel rotates, the pawl 164 is urged by the spring 167 toward engagement with the wheel and, upon engagement with the next succeeding projection 165C, arrests the stamp feed wheel after it has moved through one stamp length.

At the time that the pawl 164 halts the rotational movement of the stamp feed wheel 166, the latch pin 145 is located directly below the latch portion 146 of the actuating cam lever 87. The biasing spring 83 applies a clockwise movement to the cam lever 87 sufficient to bring the member 146 into latching engagement with the latch pin. However, since the eccentric 139 has not completed its cycle of operation, the continued rotation of the eccentric again reverses the movement of the bell crank yoke 141 and causes the yoke to pivot in a clockwise direction about its shaft 143. As the bell crank moves in a clockwise direction, the pitman is again moved to the right, pivoting the lever 158 in a counterclockwise direction. This secondary movement of the bell crank, the pitman, and the lever 158 is much smaller in magnitude than the initial stamp-feed movement. Consequently, the engagement between the pawl 160 and the stamp feed wheel is relieved, but the pawl lever 162 is not moved enough to release pawl 164 and permit another stamp feeding cycle. Thus, the stamp feed mechanism is returned to its normal or home position as shown in the several figures and is ready for the next cycle of operation.

After the envelope advancing through the mailing machine clears the follower 132, the follower, which is biased by the spring 135, is permitted to drop back down into the slot in the ramp 79, where it is ready to contact the leading edge of the next envelope advancing up the ramp 79. It will be remembered that each envelope is spaced from the preceding envelope by a substantial distance, so that the follower 132 remains in its "home" position until engaged by the next advancing envelope.

It is thus seen that the stamp feeding operation is under positive control of the envelope as the envelope advances through the mailing machine. A linkage actuated directly by the envelope may be utilized to operate the stamp feed mechanism, in which case the eccentric 139 and the arms 137 and 138 of the cam lever 87 may be eliminated. For this purpose, the lower portion of the bell crank 141 may be shaped differently to form an actuating cam lever, such as the stamp affixing cam lever 180, described hereinafter, extending downwardly between the conveyor belts 26A and 26B, for actuating the stamp feed mechanism directly. A preferred direct-drive apparatus is described hereinafter in connection with FIGURES 13 et seq. In some instances, a direct-acting arrangement of this kind is advantageous; on the other hand, it may entail some lengthening of the mailing machine and may require an increase in the overall size of the machine. In general, therefore, it may be said that use of the eccentric as an intermediate element in the stamp feed mechanism is primarily a matter of design choice and in those instances where size is not a controlling factor it may be desirable to actuate the stamp feed mechanism directly from a cam lever or other contact member on the lower end of the bell crank yoke 141.

*Stamp affixing mechanism*

Portions of the stamp affixing mechanism of the mailing machine 20 are shown in FIG. 2 in operative relation to the remainder of the machine; parts of the stamp affixing mechanism are also shown in substantial detail in FIGS. 7–12. As indicated in these figures, this embodiment of the stamp affixing mechanism includes an actuating cam lever 180 which is pivotally supported upon a shaft 181 and which extends down between the conveyor belts 26A and 26B of the mailing machine into the path of envelope travel. A pin 182 is affixed to the cam lever 180 and extends rearwardly therefrom, as seen in FIG. 2, into engagement with a lever 183 which is pivotally supported upon a stub shaft 184. The lever 183 is yieldably connected to a second lever 185 by means of a spring 186, the lever 185 also being journaled upon the shaft 184. The lever 185 includes an extension 187 which engages a pin or roller 188 mounted on a carriage 189.

As best shown in FIGS. 9 and 10, the carriage 189 comprises a support member 190 and a second similar support member 191, both of which are pivotally supported upon a shaft 192. The shaft 192 is affixed to and extends forwardly from the frame member 41. The carriage 189 further includes a shaft 193 which extends between the support members 190 and 191 and which is utilized as a pivotal support for certain of the operating elements of the stamp affixing mechanism. At the end of the support members 190 and 191 opposite the shaft 192, the two support members are joined by a knife-actuating member 194 which is provided with a slot 195 for engaging a pin 196 mounted upon a knife member 197.

As best shown in FIG. 12, the knife member 197 is pivotally mounted upon the support bar 155 as by means of a pin 198. A stamp guide slot 200 is formed in the lower surface of the support bar 155 and is enclosed by a stationary shear member 201 affixed to the underside of the support bar 155. It is through this slot 200 that the stamp strip 170 is fed as it leaves the stamp chute 175 and the inner stamp separating guide, as best shown in FIG. 9. The knife 197 is of conventional form and is essentially similar to the knife members utilized in many different forms of paper cutters; the knife member 197 is utilized to sever the individual stamps in the course of the stamping operation. A compression spring 199 is employed to bias the blade 197 toward contact with the stationary knife 201.

A stamp-moistening device 203 is included in the stamping machine and is mounted immediately adjacent the stamp severing mechanism comprising knife members 197 and 201. The moistener 203 comprises a support member 204 having a pair of extension portions or arms 204A, only one of which appears in the drawings. The two arms 204A are pivotally mounted upon suitable pivot pins 204A, one of the pins being affixed to the cantilever support member 154 and the other being affixed to the frame member 41. The two arms 204A and the base section 204C of the moistener support member 204 may be conveniently fabricated as an integral stamped or punched sheet metal part, the base section 204C joining the two arms of the support member.

A stamp moistening wick 205 is supported upon the base section 204C of support member 204, being maintained in position thereon by means of a pair of guide members 207 which are affixed to and extend across the base section. Preferably, the wick 205 is encased in a cartridge-like metal shell 206 which engages the two guide members 207. The portion of the wick 205 not encased in the cartridge 206 extends rearwardly and downwardly through an aperture 209 in the frame member, being encased in a flexible tube or conduit (not shown), and up to the outlet opening of a second water reservoir 210 shown in FIG. 1A. As in the case of the previously described sealer wick 109, the stamp moistener wick 205 may be formed from any suitable wicking material, capillary action being relied upon to transport the water through the relatively slight elevation separating the upper or moistening portion of the wick and the reservoir.

The stamp moistener support member 204 is also provided with a hook-shaped extension portion 204D which engages the pin 188 on the carriage 189 (see FIG. 8). A biasing spring 208 is connected between one of the arms 204A of the support member 204 and the cantilever arm 154; this spring 208 urges the support member toward its illustrated normal or home position, with the hook portion 204D thereof in engagement with the pin 188.

A first stamp guide member 211 is pivotally supported upon shaft 193 of the carriage 189; as indicated in FIGS. 9 and 10, the guide member 211 includes a pair of arms 212 and 213 joined at their forward end by a shaft 214 upon which a stamp-affixing pressure roller 215 is journaled. The arm 213 extends rearwardly from shaft 193 and is pivotally connected to a lever 216 as indicated by the linkage pin 217. Lever 216 is provided with a slot 218 which engages a pin 219 supported upon the frame member 41 of the machine. A biasing spring 220 is also utilized in connection with the lever 216, being connected between the upper end of the lever and the pin 219. The two arms 212 and 213 of the guide member 211 are joined by a guide or support surface 222. The stamp affixing assembly further includes a second guide member 223 comprising a pair of forwardly extending arms 224 and 225 each of which is provided with an inwardly extending flange 226, the base or pivot portions of the two arms being joined by a vertically extending back member 227. The arms 224 and 225 are also provided with extensions or ears 228 which permit pivotal mounting of the guide member upon the shaft 193. A biasing spring 229 interconnects the back member 227 and the pivot pin 217.

As an envelope advances through the mailing machine, and after actuation of the stamp-feeding mechanism as described hereinabove, the envelope encounters the stamp-affixing actuating cam lever 180. Engagement of the envelope with the cam lever 180 forces the cam lever to pivot in a counterclockwise direction about its support shaft 181, thereby driving the pin 182 upwardly and causing the lever 183 to pivot in a clockwise direction about the shaft 184. The yieldable connection between the lever 183 and the lever 185 causes the latter to pivot with the lever 183, thereby causing the end 187 of the lever 185 to drive the carriage 189 downwardly by virtue of the engagement thereof with the roller mounted upon pin 188.

When thus actuated, the carriage 189 pivots about the shaft 192, moving in a clockwise direction as seen in FIGS. 2 and 9. This downward movement of the support members causes the slotted portion 195 of the knife-actuating member 194 to engage the pin 196 on the knife 197, pivoting the knife in a clockwise direction as seen in FIG. 12 and severing a stamp from the strip 170. As indicated hereinbefore, the movement of the stamp strip takes place before the stamp affixing operation is initiated and the parts of the machine are aligned in such a manner that the knife severs the strip at the boundary between two stamps. Moreover, the forward movement of the stamp strip causes it to traverse the wick 205, thereby moistening the stamp before it is severed from the strip.

As the pivotal movement of carriage support members 190 and 191 continues, the engagement of pin 219 in the slot 218 of lever 216 causes the lever 216 to move upwardly with respect to the support members and to rotate in a counterclockwise direction with respect to the pin 219. At first, this movement is relatively slight, since the slot 218 is relatively long as compared to the diameter of the pin 219 and the lever, at first, moves longitudinally with respect to the pin; accordingly, actuation of the blade 197 is substantially complete before lever 216 pivots to any substantial degree. Subsequently, however, when the pin 219 reaches the lower edge 230 of slot 218, the lever 216 can no longer move longitudinally with respect to the pin; consequently, pivotal movement of the lever with respect to the pin is greatly accelerated. Moreover, when the longitudinal movement of lever 216 with respect to the pin is arrested, continued movement of the carriage 189 causes the guide member 211 to rotate at a relatively high speed with respect to the shaft 193, since the guide member is pivotally affixed to the lever 216 by the pin 217. This pivotal movement of the guide member forces the pressure roller 215 down against the edge of the stamp carried by the guide surface 222. Consequently, the stamp is forced down below the lower surface of the carriage support members 190 and 191 and into contact with the envelope surface as the envelope moves along the conveyor of the mailing machine. The guide member 223 maintains the stamp in alignment as this operation is carried out and prevents it from becoming twisted or misaligned as it is applied to the envelope. The roller 215 thus operates as a stamp affixing roller and assures good contact between the stamp and the envelope. Subsequently, as the envelope is driven between rollers 57 and 100, additional pressure is applied to further assure a good seal between envelope and stamp. It should be emphasized that, although this dual-pressure arrangement is not absolutely essential, it is highly desirable in that it gives positive assurance of adequate sealing of the stamp to the envelope. The wick 205 and its support members do not interfere with the stamp-affixing operation, since the downward movement of carriage 189 causes pin 188 to move downwardly, forcing the wick support 204 to pivot counterclockwise about the axis defined by the pins 204B. This pivotal movement of the support member 204 clears the stamp moistener from the path of the stamp affixing apparatus and permits unimpeded movement of the stamp into contact with the envelope.

After the stamp-affixing operation has been completed it is of course necessary to restore the various elements of the stamping apparatus to their normal or unactuated position. For this purpose, a spring 232 may be connected between the frame member 41 and the support member 191 of the stamp affixing carriage 189. Spring 232 is utilized to return the carriage 189 to its initial or "home" position by impelling the carriage in a counterclockwise direction with respect to the support shaft 192. This return movement of carriage 189 in turn rotates the composite lever assembly 183-185 in a counterclockwise direction about shaft 184; the return rotation of the lever 183 causes that member to engage the pin 182 and return the cam lever 180 to its initial or unactuated position as shown in FIG. 2. The return movement of the carriage 189 also restores blade 197 to its initial position by virtue of the engagement of the knife-actuating member 194 with the pin 196. Moreover, restoration of the carriage 189 to its unactuated position permits the stamp support member 204 to return to its initial or moistening position in response to the biasing force exerted by spring 208.

The mailing machine 20 is quite flexible in operation and affords several inherent advantages as compared with previously known devices. For example, it may be desirable, in some cases, to utilize the machine solely for applying stamps to envelopes, folders or the like. The machine may be set up for operation in this manner by removing the ramp 79 and replacing it with a similar ramp which does not afford a blade edge such as the blade edge 104. With a continuous ramp thus installed in the machine instead of the blade ramp 79, the machine operates efficiently and effectively to apply stamps to folders, envelopes, or other similar devices without operating to seal them and without tending to tear or otherwise damage them. However, it should be noted that the machine will stamp any type of card without any changes or adjustments to the machine.

Similarly, the machine may be employed solely to seal envelopes without applying stamps thereto. For this purpose, it is only necessary to remove the stamp roll 171 from the machine. If desired, however, a separate control lever may be connected to the follower member 132 to permit the operator to rotate the follower member counterclockwise and lock it in an elevated position, thereby preventing an advancing envelope from engaging the follower member 132 and inactivating the stamp feed mechanism. Thus, the stamp affixing mechanism continues to operate but no stamp is applied and it is unnecessary to remove the stamp roll 171. A specific example of a lockout or by-pass mechanism for the stamping apparatus is described hereinafter.

The moving parts of the machine are relatively few in number, considering the complexity of the functional aspects of the machine; of perhaps greater importance is the fact that virtually all of the levers, carriages, and similar parts may be formed by inexpensive stamping or punching operations from ordinary sheet metal stock. Alternatively, the various levers and cams, as well as the rollers, may be molded from suitable plastics such as nylon. These parts, whether made from plastic material or sheet metal, are extremely inexpensive to manufacture and, with the single exception of the stamp feed wheel 166, may be fabricated to ordinary machine shop tolerances without in any way adversely effecting operation of the machine. As indicated hereinabove, it is highly desirable that some type of self-lubricating bearings be employed for the conveyor and other rollers of the machine, since these members are the most likely to show some degree of wear in continued operation. The consistent use of stationary shafts in the machine affords exceptional rigidity and stability, thereby adding materially to the service-free life of the machine.

In the embodiment described hereinabove, the conveyor employed for advancing the envelopes through the machine comprises a pair of continuous belts which extend from one end of the machine to the other. This arrangement is quite economical and avoids any necessity for individual drive belts or other drive transmission means for individual conveyor devices; the entire machine is driven by the single drive belt 48 which is connected to the initial drive roller 52 of the conveyor. It will be understood, however, that the belt-type conveyor arrangement shown herein may be replaced by a series of individual drive rollers without departing in any way from the inventive concept, since operation of the invention is in no way dependent upon any particular type of conveyor or other envelope-advancing apparatus. In this connection, it should be noted that the term "envelope" as used throughout this specification and in the appended claims is intended to refer to other mailing pieces such as folders, cards and other materials as well as to envelopes, since the stamping portion of the machine is equally effective in operating upon cards, folders and the like.

Maintenance of the sealing and stamping machine 20 is extremely simple. In most instances, the machine is able to operate almost indefinitely with virtually no maintenance other than the periodic filling of the two water reservoirs. Alignment and adjustment of the operating parts of the machine are relatively simple and the machine is small in size and light in weight. Of equal importance is the fact that operation of the sealing and stamping machine is extremely simple and convenient and may be accomplished by relatively unskilled personnel.

*Stamp feed mechanism—Second embodiment*

A preferred form of stamp feed mechanism 300 is illustrated in FIGS. 13–17. This mechanism comprises a shaft 301, on which there is mounted a power cam support member or yoke generally indicated by the reference character 302. The power cam support yoke 302 includes two spaced arms 303 (see FIG. 14) that are interconnected, adjacent the shaft 301, by a transverse member 304. The ends of the yoke arms 303 opposite the shaft 301 carry a cam shaft 307. That is, the shaft 307 extends between the two free ends of the cantilever arms 303.

The shaft 307 is utilized to support a power cam 308, the cam being rotatably mounted on the shaft. The power cam 308 is a relatively complex cam structure, affording four different operating surfaces. Starting at the end of the cam 308 adjacent the upper front frame member 640, in FIG. 14, it is seen that the power cam provides a stamp feed cam surface 311, a friction surface 312, a control surface 313, and a stamp shearing and affixing cam surface 314. The stamp feed cam surface 311 is relatively simple in configuration, as clearly shown in FIGS. 13 and 15. The friction surface 312 is of substantially circular configuration throughout the major portion of its length. This surface, however, is provided with a first flattened area 315 that is immediately contiguous to a recessed flat portion 316. A friction surfacing element 317, which may comprise a section of the same rubber belting or the like as is used for the belts 26A and 26B covers a major portion of the friction surface 312, starting in the recess 316 and continuing around the exterior surface 312 to a point displaced about 45° from the beginning of the flattened surface 315.

The configuration of the control surface 313 is somewhat more complex. This surface includes a notched portion 319, one edge of which is defined by a substantially radial stop surface 321 (see FIG. 16). From the outer edge of the stop surface 321, proceeding clockwise in the illustrations of FIGS. 13 and 16, the control surface 313 is a substantially circular surface, up to an abrupt juncture formed with a start surface 322. The inner end of the stop surface 322 ends in a surface that extends approximately parallel to the surface 316 of the friction or drive portion 312 of the cam. This portion of the control surface 313 does not extend outwardly to the same radius as the major portion of the friction surface 312, however, but instead leads into a reduced-radius portion 324 that extends back to the blocking notch 319 of the control portion 313 of the proper cam. The remaining operating surface 314 of the power cam 308 is utilized in connection with a preferred form of stamp affixing mechanism for the machine, and is described in detail hereinafter.

The stamp feeding mechanism 300 further comprises a shaft 331 that is mounted between the upper front frame 640 and the back frame 641 (FIG. 14). A stamp feed yoke 332 is pivotally mounted upon the shaft 331. The stamp feed yoke 332 includes a first arm or lever 333 that is located adjacent the upper front frame member 640 (see FIGS. 13 and 14). At the left-hand side of the shaft 331, as seen in these figures, the arm 333 is bent to afford a laterally extending member 334 that extends approximately parallel to the shaft 331. The opposite end of the connecting member 334 is bent to afford a generally upwardly extending arm 335. The connecting member 334 is preferably formed as indicated by reference numeral 336 for the purpose of strengthening the connecting member.

The free end of the cantilever arm 333 of the stamp feed yoke 332 carries a stud 337 upon which a cam follower roller 338 is rotatably mounted. The cam follower roller 338 engages the cam surface 311 of the power cam 308, as shown in FIGS. 13–15. The upper end of the arm 335 of the stamp feed yoke has mounted thereon a stud 339 that projects through an elongated aperture 341 in a stamp feed link 342. The medial portion of the stamp feed link 342 carries a stud 343; and a stamp feed link spring 344 is connected between the studs 339 and 343.

The end of the stamp feed link 342 opposite the elongated aperture 341 is pivotally connected, by means of a pin 346, to one arm 347 of a stamp feed lever or crank 348. The stamp feed lever 348 is pivoted upon a stub shaft 349 that is affixed to and projects inwardly of the back frame 641. The shaft 349 also has mounted thereon a stamp feed wheel 351 that is substantially similar to the feed wheel 166 of the first-described embodiment of the machine. The stamp feed lever 348 includes an arm 352 that extends out beyond the periphery of the stamp feed wheel 351. A stamp feed pawl 353 is pivotally mounted at the end of the arm 352. A spring stud 354 is affixed to the pawl 353; the stud 354 is connected by a spring 355 to a further stud 356 mounted on the arm 352 of the stamp feed lever 348.

The same stud 358 (FIG. 14) that provides the pivotal connection between the stamp feed pawl 353 and the lever arm 352 includes a projecting portion 359 (FIGS. 13–15) that engages in an elongated slot 361 in a stamp feed stop pawl 362. The stamp feed stop pawl 362 is pivotally mounted upon an elongated stud 363 that is affixed to and projects inwardly of the back frame member 641 (see FIG. 14). The pawl 362 is provided with a depending element 364 (FIGS. 13 and 15) that is aligned with and engageable in the notches intermediate the indexing teeth 365 on the stamp feed wheel 351. A restoration spring 367 is connected from the stud or pin 356 on the stamp feed lever 348 to a fixed stud 368 that is mounted on the back frame 641 of the machine.

Provision is made, in the mechanism 300, for the mounting of a stamp roll 391 on a suitable mounting spindle 392, as shown in FIG. 13. From the roll 391, a stamp strip 393 is extended over idler or guide members 394 and 395 and around a pair of straightener rolls 396 and 397. From the second straightener roll 397, the stamp strip is engaged with the pins 398 on the stamp feed wheel 351. From the stamp feed wheel 351 the stamp strip 393 extends into a downwardly extending chute 399 that leads to a stamp wetting, severing, and affixing mechanism that is described in detail hereinafter.

In addition to the members described hereinabove, the operating assembly for the power cam 308 includes a power cam control arm or lever 375 that is pivotally mounted upon the power cam support shaft 301. The lever 375 includes a depending foot 378 that is normally interposed in the path of travel of an envelope moving through the machine. The foot 378 normally projects below the level of the conveyor belts 26A and 26B. The power cam control lever 375 further includes a stop depression 379, in the medial portion of the lever, and a stop element or lug 381 on an arm at the opposite side of the lever from the depending foot 378 (see FIG. 16). The lug 381 is engageable in the locking notch 319 of the power cam 308 to lock the power cam against rotation. A torsion spring 383 is mounted on the shaft 301; one end of the spring 383 engages the power cam control arm 375 and the other end of the spring engages one side of the transverse element 304 of the power cam support yoke 302. The torsion spring 383 urges the power cam control lever 375 to clockwise rotation to assure engagement of the control arm with the power cam 308 as described more fully hereinafter.

At the start of the operation of the stamp feed mechanism 300, the orientation of the parts of the stamp feed mechanism is as shown in FIG. 13. Thus, one end 371 of the control surface 313 is engaged with a nylon idler roll 372. It should be noted that the idler 372 is independent of the main rolls over which the conveyor belts pass, so that rotation of these rolls as the result of movement of the belts does not cause a corresponding rotation of the idler 372. Consequently, and as shown in FIG. 13, the power cam 308 is held out of contact with the belt 26B, the recessed portion 316 of the power surface 312 for the cam being aligned with the belt and spaced therefrom. In this position, of course, the stamp feed cam follower roller 338 is aligned with the low point on the cam surface 311. As a consequence, the stamp feed yoke 332 is maintained in its extreme clockwise position.

Moreover, under these starting conditions, the stamp feed link 342 is held at its extreme right-hand position, as seen in FIG. 13, and the lever 348 is maintained at the extreme counterclockwise limit of its travel, these parts being held in their respective positions by the spring 367. The stop pawl 362 is maintained in its extreme counterclockwise position, the stop element 364 being elevated above the index teeth 365 on the stamp feed wheel 351. The stamp feed pawl 353 is disposed in engagement with one of the teeth 365. The stud 359 that affords the pivotal support for the stamp feed pawl 353 is at this time located at the extreme end 363 of the slot 361 in the stamp feed stop pawl 362, determining the initial starting position for the members 342, 352, 353 and 362.

As an envelope enters the stamp feed mechanism in the direction of the arrow X, the leading edge of the envelope first engages the foot 378 on the power cam control lever 375. The envelope drives the foot 378 upwardly, pivoting the control lever 375 in a counterclockwise direction against the bias afforded by the torsion spring 383. This pivotal movement of the control lever 375 lifts the stop lug 381 from engagement with the notch 319 in the control surface 313 of the power cam. This frees the cam for rotational movement.

Continued travel of the envelope along the conveyor belts in the direction of the arrow X causes the leading edge of the envelope to engage the start surface 322 of the cam. Accordingly, further movement of the envelope causes initial rotation of the power cam 308 in a counterclockwise direction. After the cam is rotated through a relatively short distance, the friction surfacing 317 on the power surface 312 of the cam is engaged by the top of the envelope. This affords a friction lock from the belt 26B through the envelope to the friction material 317 which, as noted above, may be formed of material essentially similar to the belt.

The continued movement of the envelope through the machine continues to rotate the power cam 308 in a counterclockwise direction. The rotation of the cam drives the stamp feed cam follower roller 338 upwardly, this roller riding on the cam surface 311. As a consequence, the stamp feed yoke 332 is pivoted in a counterclockwise direction toward the actuated position illustrated in FIG. 15. The counterclockwise movement of the yoke 332, and particularly the yoke arm 335, moves the connecting pin 339 generally to the left, along an arcuate path from the position of FIG. 13 toward that of FIG. 15. As a consequence, the link 342 is pulled in a generally leftward direction, as seen in FIGS. 13 and 15, pivoting the stamp feed lever 348 in a clockwise direction by virtue of the connection afforded by the pin 346.

The clockwise movement of the stamp feed lever 348 drives the stamp feed pawl 353, and this pawl in turn rotates the stamp feed wheel 351 in a clockwise direction. As a result, the stamp strip 393 is pulled from the roll 391 over the idlers 394 and 395 and through the straightener rolls 396 and 397 and is driven downwardly through the chute 399. The straightener rolls 396 and 397 are provided only to reduce the "curl" of the stamps to permit more effective handling in the stamp affixing mechanism to be described hereinafter.

As the lever 348 is pivoted in a clockwise direction, feeding the stamp strip, the stud 359 at the end of the arm 352 of the stamp feed lever rides along the slot 361 of the stop pawl 362 from the left-hand end toward the right-hand end of the slot. This movement of the pin 359 along the slot 361 drives the pawl 362 in a clockwise direction, pushing the stop element 364 downwardly into the path of the indexing teeth 365. The lug 364 engages one of the teeth 365 and interrupts the rotational stamp feeding movement of the stamp feed wheel 351 after the stamp strip 393 has been fed precisely one stamp length. In this manner, exactly one stamp length of the strip 393 is fed into the chute 399 without requiring precision control of the driving mechanism for the stamp feed wheel, since the limitation on length of stamp strip to be fed is provided by the stop pawl 362.

When the stop pawl 362 operates to lock up the rotational movement of the stamp feed wheel 351, continued movement of the stamp feed lever 348 and the pawl 353 is also interrupted. This usually takes place before rotational movement of the stamp feed yoke 332 is completed, in a counterclockwise direction. Once the aforesaid locking action has occurred, however, the resilient connection between the arm 335 of the stamp feed yoke and the link 342 permits continued rotation of the arm 335 in a counterclockwise direction without further movement of the stamp feed link. This resilient connection is provided, of course, by the stamp feed link spring 344. From the mounting arrangement for the power cam 308 as described in detail hereinabove, it will be apparent that the movement of the stamp feed yoke 332 may vary to a substantial extent, depending upon variations in the thickness of the envelopes that are fed through the machine. It is for this reason that a relatively long slot 341 is utilized in the connection between the yoke arm 335 and the stamp feed link 342; this permits substantial variation in the differential movement of the arm 345 relative to the link 342 after the movement of the stamp feed lever 348 is interrupted.

With continued rotation of the power cam 308, afforded by the advancing movement of the envelope through the machine, the roller 338 reaches a portion of the cam surface 311 extending back toward the shaft 307. As this happens, the roller 338 is free to move inwardly toward the shaft 307, permitting clockwise movement of the yoke 332 back from the position of FIG. 15 toward the position of FIG. 13. At first, the clockwise rotation of the yoke 332 is effected by the spring 344, which pulls the pin 339 on the yoke arm 335 to the right through the slot 341 into stamp feed link 342. Once the pin 339 reaches the limit of movement in the slot 341, continued restoration movement of the link 342 is effected by the spring 367, which operates to rotate the stamp feed lever 348 in a counterclockwise direction. The counterclockwise movement of the stamp feed lever 348 pulls the link 342 to the right by virtue of the connection provided by the pin 346. Moreover, the counterclockwise movement of the stamp feed lever 348 moves the pin 359 to the left through the slot 361 in the stamp feed stop pawl 362. The stop pawl 362 is, consequently, rotated in a counterclockwise direction, lifting the stop element 364 out of engagement with the stamp feed wheel 351. As this operation continues, the stop pawl 362 is restored to its initial position (FIG. 13) and this is also true of the lever 348 and the link 342. In the restoration movement, effected by the action of the spring 367, the stamp feed pawl 353 rides up over the next index tooth 365 on the stamp feed wheel and, upon completion of this movement, drops down into engagement with that indexing tooth.

During the restoration movement described above, the power cam 308 continues to rotate, and this rotation is further continued after restoration is completed. With this continuing rotation, the stud 377 on the power cam 308 engages the dwell surface 379 of the power cam control arm 375, as shown in FIG. 16. This engagement prevents further rotation of the power cam 308. It should be noted that at this point in the operating cycle of the stamp feed mechanism, the portion 381 of the power surface 312 is aligned with the envelope that is passing through the machine. There is no friction belting or other friction material on this surface 381 of the cam; on the contrary, this portion of the cam surface is preferably made quite smooth to hold friction to a minimum. Accordingly, the envelope is now permitted to slide past the power cam 308, along the belt 26B, without further rotation of the power cam. This locks up the power cam and prevents the feeding of a second stamp in the event that an extremely long envelope is passed through the machine. In fact, the power cam 308 remains locked up (by the pin 377 and the lever 375) to prevent a stamp feeding operation, and also to prevent a second stamp affixing operation as described hereinafter, regardless of the length of the envelope passed through the machine. This makes it possible for the stamp feed mechanism to operate with envelopes of virtually any length, from very short envelopes to very long envelopes.

The latching operation with respect to the power cam 308, provided by engagement of the stud 377 with the dwell surface 379 of the control arm (FIG. 16), is maintained only as long as a part of the envelope engages the foot 378 on the control arm 375. Subsequently, when the trailing edge of the envelope clears its engagement with the foot 378, the control arm 375 is pivoted in a clockwise direction by the torsion spring 383. This pivotal movement is relatively small in magnitude but clears the dwell surface 379 from engagement with the stop pin 377. Consequently, further rotation of the power cam 308 is permitted, and this is effected by the relatively light frictional engagement of the envelope with the smooth surface 381 of the power cam. The stud 377 also tends to push the control lever 375 out of the way, by virtue of its engagement with the dwell portion 379 of the control lever.

With continued rotation of the power cam 308, the stop element 381 rides over the clearance portion 324 of the control surface 313 of the cam. Eventually the stop lug engages the stop surface 321 of the cam. Of course, by this time the stud 377 has cleared the dwell portion of the control arm 375. When the lug 381 hits the stop surface 321, it drops into the notch 319, this movement being effected by the torsion spring 383. This locks the power cam 308 in the position illustrated in FIG. 13. The provision of a definite locating surface such as the notch 319 prevents rebound of the power cam 308, which might otherwise lead to erratic operation of the stamp feed mechanism and other devices controlled by the power cam. At this point, the stamp feed mechanism is completely restored to its initial operating condition as shown in FIG. 13 and is ready for the next operating cycle, which proceeds in the same manner as described above.

In some instances, it may be desirable to pass envelopes through the machine without affixing stamps thereto, particularly where the stamping mechanism is incorporated in a machine that also seals envelopes. Thus, it may be desirable to utilize the machine solely for the sealing of envelopes and not to affix postage thereto. To this end, a lock-out or by-pass device is provided for the stamp feed mechanism.

The lock-out device is quite simple in construction and comprises a non-stamp operating lever 385 that is pivotally mounted upon a short stud 386, the stud 386 being affixed to the front upper frame of the machine. One end 387 of the lever 385 comprises a handle member and also affords a stop member. Thus, the stop member 387 normally rests on the top surface of the upper front frame member. With the stop lever 385 in this position, the position shown in FIG. 13, it does not affect operation of the mechanism proceeding as described above.

The normal inactive position for the lever 385 is shown in FIG. 13. However, the lever can be moved pivotally about the axis afforded by the stud 386, to the alternate position shown in FIG. 17. When this is done, the end 388 of the lever opposite the stop member 387 engages an extension 389 that comprises a part of one side frame member 303 of the power cam support yoke 302. When the lever 385 is moved to this second operative position, it drives the extension 389 downwardly, thereby pivoting the power cam support yoke 302 in a clockwise direction and lifting the power cam 308 and the power cam control arm 375 up above the surface of the conveyor belts to an extent sufficient that an envelope cannot trigger operation of the stamp feeding mechanism. The resulting separation between the operating members of the stamp feed mechanism and the working surface of the conveyors is made great enough so that even quite thick envelopes can be passed through the machine without triggering a stamp feeding operation. Moreover, this same action prevents a stamp affixing operation, since the latter is controlled by the cam 308 as described hereinafter.

Stamp affixing mechanism—Second embodiment

The stamp wetting and affixing mechanism 400 is also actuated and driven by the power cam 308. The operating mechanism for stamp affixing is best illustrated in the assembly views of FIGS. 18 and 21, which show the apparatus in two extreme operating positions. As illustrated in these figures, and in FIG. 19, the stamp affixing mechanism includes an applicator yoke 411 that is pivotally mounted upon a traverse shaft 412, the shaft 412 being mounted upon and projecting inwardly of the machine from the back frame 641. The applicator yoke 411 comprises two cantilever arms 413 and 414 joined at their opposite ends as indicated by the arms 415 and 416. At the free end of the yoke 411, the transverse or bridging portion 416 of the yoke is extended downwardly over the front face of the yoke to provide a cam slot 417 for driving the cutting knife 474 (FIGS. 22, 23) that severs individual stamps from the stamp strip 393.

A stamp catcher support shaft 418 is mounted in the medial portion of the yoke 411 between the two arms 413 and 414. On this shaft 418 there is mounted a stamp catcher or guide 419. The catcher 419 is substantially U-shaped in cross sectional configuration, the base portion 421 of the catcher being relatively flat. A stop member 422 is provided within the catcher 419 to limit the movement of a stamp into the catcher; this member 422 may be provided by slitting a portion of the base 421 of the stamp catcher 419 and bending it upwardly to provide the stop. A biasing spring 423 is connected to the stamp catcher 419, the other end of the spring being secured to a stud 424 that is mounted upon the back frame 641 of the machine. The spring 423 biases the catcher 419 toward movement in a counterclockwise direction, normally maintaining the upper surface of the catcher in engagement with a stud 425 that affixed to the back frame of the machine as shown in FIGS. 18 and 19.

The stamp affixing mechanism also includes a knife operating arm or lever 427. The knife operating lever 427 is pivotally mounted upon the stud 425. A cam follower roller 428 is mounted upon the knife lever 427, and this roller engages the shearing and affixing cam surface 314 of the power cam 308. A spring 431 is connected to one projection 432 of the knife operating arm 427. The other end of the spring 431 is connected to the shaft 331. The spring 431 normally tends to maintain the knife operating arm 427 in the position illustrated in FIG. 18, biasing the arm 427 toward movement in a counterclockwise direction. The knife operating arm 427 operates in cooperation with a stamp affixing operating arm 434. The operating arm 434 is pivotally mounted on the same shaft 425 that carries the knife operating arm 427. The operating arm 434 is provided with a lug 435 to which one end of a spring 436 is connected. The other end of the spring 436 is connected to a lug 437 on the knife operating arm 427. A further lug 438 on the stamp affixing operating arm 434 engages the top surface 439 of a projection 441 on the knife operating arm 427. Accordingly, it is seen that the spring 436 normally holds the two arms 427 and 434 in alignment with each other, as shown in FIG. 18, with the lug 438 engaged with the surface 439.

The operating arm 434 is provided with a slotted nose portion 443 that receives, in the slot, a roller 445. The roller 445 is mounted upon a relatively short shaft 446. The shaft 446 is a cantilever member that is affixed to one side 414 of the applicator yoke 411 (see FIG. 19).

A stamp affixing roller or pressure roller 448 is mounted between the two opposed arms 449 of a stamp roller yoke 452. The two yoke arms 449 are connected by a transverse member 453. The yoke 452 is pivotally mounted upon the shaft 418 intermediate the two sides of the catcher 419. The stamp roller yoke includes a projecting lug 454 that is utilized to engage the catcher 419, and specifically the bottom of the catcher, to drive the catcher to actuated position as described more fully hereinafter. One arm 449 of the stamp roller yoke 452 is extended as indicated by reference numeral 457 and is pivotally connected by a pin 458 to a vertically slidable control link 459. The link 459 is provided with an elongated central aperture 461 that is engaged with the stud 424. Thus, the control link is permitted to slide relative to the stud. A spring 463 is connected at one end to the stud 424 at the other end to a projection 464 on the slide or link 459. The spring 463 tends to drive the link 459 downwardly and, accordingly, tends to maintain the link in the initial position shown in FIG. 18.

The stamp cutting or severing apparatus for the preferred embodiment of the stamp affixing apparatus 400 is best illustrated in FIGS. 19, 22 and 23. As shown therein, a transverse support member 501 is mounted immediately adjacent the stamp affixing mechanism, the member 501 extending between and being affixed to the front and rear frame members 640 and 641 as illustrated in FIG. 19. The upper member 502 of the stamp feed chute 399 comprises an integral part of the support member 501, the lower section of the stamp feed chute being supported therefrom as by suitable support screws engaged in the apertures 503.

The lower portion of the support member 501 is bent at a small angle, as shown in FIGS. 19 and 22, forming a support lug 504. A stud 505 is mounted in the depending support lug 504 and affords a pivotal mounting for the knife or severing member 474. The edge 506 of the knife 474 is aligned with the cutting edge 473 at the end of the chute 399. A compression spring 507 is mounted on the stud 505 and is utilized to bias the knife 474 toward engagement with the cutting edge 473. Thus, when the carriage 411 is driven downwardly in the course of a stamp affixing operation, as described hereinafter, the knife edge 506 sweeps across the mating edge 473 and provides a clean cutting action, cutting a single stamp length off at the edge 473.

The support member 501 is also utilized to mount the stamp moistening apparatus for the stamp affixing mechanism 400. Thus, as best shown in FIG. 19, a projecting lug or ear 511 is formed as an integral part of the support member 501. As shown in FIG. 20, the lug 511 affords a support for one end of a stamp moistener carriage 512 that is of substantially U-shaped configuration. The connection between the members 511 and 512 is a pivotal one, provided by a mounting pin or stud 513. The opposite end of the carriage 512 is also pivotally mounted on the support member 501 as by the pin 514.

One side of the carriage 512 includes a forwardly projecting cam portion 516 that extends into engagement with the cantilever roller 455 carries by the yoke 411 (see FIGS. 17 and 21). The lower portion of the carriage 512 is utilized to suspend the wick 471, which may be enclosed in a metal or plastic cartridge 519. As shown in FIG. 20, the wick 518 extends downwardly into a suitable reservoir as indicated generally by reference numeral 521. The tip end 522 of the wick 471 projects into the path of the stamp 472, as it is fed from the chute 399, as illustrated in FIG. 18. The carriage 512 is normally maintained in the position shown in FIG. 18 by its own weight; if desired, a bias spring may be employed to maintain the stamp moistener in this initial position.

In considering operation of the stamp affixing mechanism 400, it is first desirable to note that the actuation and operation of this mechanism is controlled and driven by the cam follower roller 428 carried by the knife operating arm 427. This roller, as noted above, engages the stamp shearing and affixing surface 314 on the power cam 308. The configuration of the cam surface 314 is such that the cam follower roller 428 remains in the position illustrated in FIG. 18, the starting position for the mechanism, without substantial movement until such time as a complete stamp feeding operation has been accomplished and a stamp has been passed through the chute 399, across the wick 471, and to the position 472 (FIG. 18). This stamp feeding operation is controlled in length, as described hereinbefore, so that exactly one stamp length projects outwardly of the knife edge 473 at the end of the chute 399. It should be noted that the stamp in the position 472 projects well into the catcher 419, reaching approximately to the catcher stop element 422.

After the stamp feeding operation is completed, the continued rotation of the cam surface 314 drives the cam follower roller 428 upwardly from the position of FIG. 18 toward that shown in FIG. 21. As a consequence, the knife operating lever 427 is pivoted in a clockwise direction about the stud 425. Initially, the pivotal movement of the lever 427 drives the cantilever roller 445 downwardly, pivoting the applicator yoke 411 in a clockwise direction about the shaft 412. In the initial portion of the operating cycle for the stamp affixing mechanism 400, this downward movement of the yoke 411 causes the knife 474 to cut off the single stamp length 472 at the knife edge 473 of the chute 399. Control of knife movement is afforded by means of the stud 475 that projects into the slot 417 at the front end of the yoke 411 (see FIGS. 22, 23).

As the yoke 411 starts its downward movement, in response to the downward movement of the cantilever roller 445, there is a tendency for the catcher 419 to move downwardly with the yoke. During the early part of the operating cycle, however, substantial downward movement of the catcher is prevented by the spring 423, which holds the catcher up in engagement with the stud 425. In this same portion of the cycle, while the stamp is being cut off, the downward movement of the shaft 418 that is affixed to the yoke 411 also tends to move the stamp roller yoke 452 downwardly. However, as the applicator yoke 411 moves downwardly, this movement is followed by the control link 459, which is driven downwardly by the biasing spring 463. As a consequence, the pivot pin 458, which is mounted on the slide, is also moved downwardly. Thus, the yoke 452 is maintained in engagement with the stud 425 and is prevented from pivoting or otherwise moving downwardly in conjunction with the applicator yoke during this portion of the cycle. Consequently, the stamp affixing roller 448 is held up above the stamp 472.

After completion of the initial portion of the operating cycle for the stamp affixing mechanism 400, when cutting of the stamp is completed, the continued clockwise movement of the operating arm 427 moves the applicator yoke 411 in a clockwise direction by virtue of engagement of the roller 445 with the applicator yoke. Consequently, the shaft 418 continues its downward movement. The corresponding downward movement of the control link 459 is interrupted, however, by engagement of the pin 424 with the top of the elongated slot 461 in the link 459, relative position of the pin 424 and the link 459 being shown in FIG. 21. Once this position has been reached, with respect to the members 459 and 411, continued downward movement of the applicator yoke 411 and the consequent downward movement of the shaft 418 causes the roller yoke 452 to pivot, relative to the applicator yoke 411, about the pivotal connection provided by the pin 458. The distance between the shaft 418 and the pivot pin 458 is relatively short as compared with the distance from the shaft 418 to the axis of the applicator roller 448. Consequently, once pivotal movement of the stamp roller yoke 452, relative to the applicator yoke 411, is started, the roller 448 moves downwardly at a rate higher than the rate of downward movement of the end of the applicator yoke 411. This action takes place after the relative movements of the parts has cleared the cantilever roller 445 from engagement with the end portion 441 of the operating arm 427. Consequently, it is seen that the downward movement of the applicator yoke 411 and of the stamp roller yoke 452 is effected through the resilient connection provided by the spring 436. It will be apparent, from inspection of FIGS. 18 and 21, that the relative movement of the cantilever roller 445 to a point where it is clear of the end portion 441 of the operating arm 427 takes place because of the difference in pivot points for the arm 427 and the yoke 411 that supports the roller 445.

With accelerated movement of the roller 448 relative to the movement in the same general direction, of the applicator yoke 411, the stamp affixing roller 448 moves down past the end of the yoke 411. Although the roller 448 started out below the end of the yoke 411 (FIG. 18), the yoke initially moves downwardly past the roller 448, during the early part of the operating cycle when the roller 448 is held up, as noted above. The subsequent relative downward movement of the stamp affixing roller 448 past the end of the yoke 411 brings the lug 454 into engagement with the bottom of the catcher 419. At about the same time, the roller 448 engages the projecting end of the severed stamp 472 that rests in the catcher 419. Consequently, the catcher 419 and the roller 448 move downwardly together against the biasing force afforded by the spring 423. It should be noted that engagement of the lug 454 with the catcher 419 is effected only after the stamp roller moves to a point where it projects slightly below the bottom of the catcher. This is important to prevent dragging the catcher on the envelope during the actual stamp-affixing operation. Of course, clearance must be allowed between the end of the catcher and the roller 448 to permit the stamp to be pulled out of the catcher by the roller.

The final stamp affixing position of the mechanism is shown in FIG. 21. As illustrated therein, the downward movement of the catcher 419 and the stamp roller 448 brings these elements to a position where the stamp roller presses the stamp into contact with the surface of an envelope (not shown) moving through the machine. Of course, the pressure-applying mechanism is resilient, since the driving connection to the applicator yoke 411 and to the roller yoke 452 is effected through the spring 436. This permits acceptance of envelopes of various thickness in the stamp affixing mechanism without damage to the mechanism or to the envelope. In the position illustrated in FIG. 21, the stamp roller 448 effectively seals the stamp to the envelope, as the leading portion of the envelope passes under the roller, the stamp being pulled out of the catcher 419 over the front edge of the base portion 421 of the catcher.

The cam surface 314 of the power cam 308, by its engagement with the cam follower roller 428 on the operating arm 427, holds the stamp affixing mechanism in the position of FIG. 21 long enough to press the roller 448 completely across the length of the stamp. Shortly after the trailing edge of the stamp has cleared the catcher 419 and has been pressed onto the envelope, the configuration of the cam surface 314 permits a slight retrogressive movement of the cam follower roller 428 in a downward direction toward the shaft 307. This permits a slight return movement of the mechanism toward the initial position of FIG. 18, this movement being sufficient to elevate the roller 448 above the surface of an envelope of maximum thickness passing through the machine. This is done only in order to avoid excessive dragging of the roller across the surface of the envelope. The retrogressive movement is halted, of course, when the power cam 308 is held in the intermediate operating position of FIG. 16 pending clearance of the envelope from the power cam. Thereafter, when the power cam 308 returns to its initial position, as described above, the entire mechanism 400 is restored to the original operating position shown in FIG. 18, the necessary restoring forces being afforded by the springs 423, 431, 436 and 463.

The stamp moistening operation is substantially similar to that described in connection with the initial embodiment of the invention. Thus, at the beginning of the operating cycle for the stamp affixing mechanism 400, the moistener carriage 512 is maintained in the position shown in FIG. 18 with the tip end 522 of the wick 471 positioned to engage the lower surface of the stamp 472 as the latter is fed out of the chute 399. Consequently, as the stamp enters the chute its lower surface is wiped by the end 522 of the wick and is moistened.

At a later point in the operating cycle, after the stamp 472 has been severed, as described above, the continuing downward movement of the yoke 411 from the position of FIG. 18 toward the position shown in FIG. 21 causes the cantilever cam roller 455 to push the member 516 of the carriage 512 downwardly, rotating the carriage in a counterclockwise direction about the pivot pins 513 and 514. Thus, near the completion of the stamp-affixing cycle, the moistener carriage 512 is rotated to a position in which the wick is completely displaced from engagement with the stamp, the limit of this movement being clearly shown in FIG. 21. Accordingly, the moistener does not interfere with the stamp affixing operation in any way.

In connection with the stamp moistening operation, it is important to provide for an even and reliable supply of water at the moistener tip 522 of the wick 471. Moistening action can be greatly improved by the action of a small quantity of detergent to the water supply 521 (FIG. 20) since this materially assists the wetting of the wick 471 and improves the efficiency of the wick in raising the water from the reservoir to the wetting point 522 by capillary action. Usually, it is desirable to use a detergent compound that also includes a rust inhibiting agent, particularly where operating parts for the stamp affixing mechanism are to be fabricated for a metal readily subject to this form of corrosion.

In each of the two embodiments of the present invention described hereinabove, means are provided for applying postage to an envelope in a reliable and effective manner, utilizing a stamping mechanism that is relatively small and inexpensive. The stamping mechanism requires a minimum of maintenance, yet is not subject to any requirement for critical adjustment with respect to variations in envelope size or thickness. All operations of the machine, in each instance, are controlled solely by the movement of an envelope or other mailing piece through the mechanism, so that the speed of operation of the conveyor that drives the envelope is immaterial with respect to successful operation of the machine. Accordingly, there is no need for or use of complex and critical timing devices of any kind.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. In a stamping machine including conveyor means for transporting envelopes along a predetermined path and further including means for advancing a stamp strip by a preselected length each time an envelope traverses a given portion of that path, a stamp-affixing mechanism comprising: an actuating member extending into the path of envelope movement and movable through a predetermined distance in response to movement of an envelope along a predetermined section of the path; a carriage for receiving the end portion of said stamp strip; means linking said carriage to said actuating member to move the carriage from a normal position aligned with the end of the stamp strip toward an actuated position adjacent the path of envelope travel; means for severing a predetermined length of the stamp strip and depositing the severed length on said carriage during the initial movement of the actuating member; a stamp-affixing pressure member; means for supporting the pressure member for movement with the carriage; and means for moving the pressure member relative to the carriage to press the severed length of the stamp strip directly from the carriage onto an envelope as the envelope traverses that part of the path immediately adjacent the end of the stamp strip, the driving force for the operation of the actuating member, the carriage, the severing means, and the pressure member, and the timing of each of the recited operations, being derived directly from movement of the envelope along the conveyor with each envelope constituting a driving element coupling the conveyor thereto.

2. In a stamping machine including conveyor means for transporting envelopes along a predetermined path and further including means for advancing a stamp strip comprising stamps of predetermined length by an integral number of stamp lengths each time an envelope traverses a given portion of that path, a stamp-affixing mechanism comprising; an actuating member extending into the path of envelope movement and movable through a predetermined distance in response to movement of an envelope along a predetermined section of the path; a carriage, pivotally mounted above the envelope conveyor in position to receive the end portion of said stamp strip; means linking the carriage to said actuating member to pivot the carriage from a normal position aligned with the end of the stamp strip toward an actuated position adjacent the path of envelope travel; means, actuated by movement of said carriage, for severing a predetermined length of the stamp strip and depositing the severed length on said carriage during the initial movement of the actuating member; a stamp-affixing pressure member; means for supporting said pressure member for movement with the carriage, above the end of the stamp strip; and means, responsive to movement of the carriage, for moving the pressure member downwardly relative to the carriage to press the severed portion of the stamp strip directly from the carriage onto an envelope as the envelope traverses that part of the path beneath the end of the stamp strip, the driving force for the operation of the actuating member, the carriage, the severing means, and the pressure member, and the timing of each of the recited operations, being derived directly from movement of the envelope along the conveyor with each envelope constituting a driving element coupling the conveyor thereto.

3. In a stamping machine including conveyor means for transporting envelopes in spaced sequence along a predetermined path and further including means for advancing a stamp strip by a preselected length each time an envelope traverses a given portion of that path, a stamp-affixing mechanism comprising: an actuating member extending into the path of envelope movement for engagement with said envelopes and movable through a predetermined distance in response to movement of an envelope along a predetermined section of the path; a carriage, mounted above the envelope conveyor in position to receive the end portion of said stamp strip; means yieldably linking the carriage to said actuating member to move the carriage from a normal position aligned with the end of the stamp strip toward an actuated position adjacent the path of envelope travel; means, actuated by movement of said carriage, for severing a predetermined length of the stamp strip and depositing the severed length on said carriage during the initial movement of the actuating member; a stamp-affixing pressure roller; means supporting said roller, above the end of the stamp strip, for downward movement with the carriage; and means for moving the pressure roller at an accelerated rate relative to the carriage to press the severed length of the stamp strip directly from the carriage onto an envelope as the envelope traverses that part of the path beneath the end of the stamp strip, the driving force for the operation of the actuating member, the carriage, the severing means, and the pressure member, and the timing of each of the recited operations, being derived directly from movement of the envelope along the conveyor with each envelope constituting a driving element coupling the conveyor thereto.

4. In a mailing machine including a conveyor for transporting envelopes in spaced sequence along a predetermined path and further including means for advancing a stamp strip an integral number of stamp lengths each time an envelope traverses an initial portion of that path, a stamp-affixing mechanism comprising: an actuating member extending into the path of envelope movement and adapted to be driven from a normal position to an actuating position by engagement with an envelope moving along a predetermined portion of the path; a carriage, mounted adjacent the envelope conveyor in position to receive the end portion of the stamp strip; means yieldably linking the carriage to said actuating member to drive the carriage from a normal position aligned with the end of the stamp strip toward an actuated position adjacent the path of envelope travel; means, actuated by the initial movement of said carriage, for severing a predetermined portion of the stamp strip and depositing the severed portion on said carriage during the initial movement of the actuating member; a stamping-affixing pressure member, supported on the carriage above the end of the stamp strip; and means linking the pressure member to the carriage for moving the pressure member relative to the carriage to press the severed portion of the stamp strip from the carriage onto an envelope as the envelope traverses the portion of the path beneath the end of the stamp strip, the driving force for the operation of the actuating member, the carriage, the severing means, and the pressure member, and the timing of each of the recited operations, being derived directly from movement of the envelope along the conveyor with each envelope constituting a driving element coupling the conveyor thereto.

5. In a stamping machine in which envelopes or the like are advanced one-by-one through a stamping station to receive stamps, a stamp-affixing mechanism comprising: a carriage, movable between a normal position and a stamping position adjacent the stamping station; means for feeding stamps into the carriage; a stamp-affixing pressure member connected to the carriage for movement with respect thereto; an actuating member, movable between an initial position and an actuating position; means for advancing an envelope toward the stamping station and into enegagement with the actuating member to drive the actuating member from its initial position to its actuating position; means linking the actuating member to the carriage in mechanical driving relationship to drive the carriage from its normal position to its stamping position as the actuating member moves to actuating position; and means for moving the pressure member in the same direction as the carriage but at an accelerated rate relative to the carriage to press a stamp from the carriage onto the envelope as the carriage reaches its stamping position, the driving force for operation of the actuating member, the carriage, and the pressure member, and the timing of the recited operations, being derived directly from movement of the envelope along the conveyor with each envelope constituting a driving element coupling the conconveyor thereto.

6. In a stamping machine in which envelopes or the like are advanced one-by-one through a stamping station to receive stamps, a stamp-affixing mechanism comprising: a carriage, movable between a normal position and a stamping position adjacent the stamping station; means for feeding a strip of stamps into the carriage; a stamp-affixing pressure member connected to the carriage for movement with respect thereto; a stamp-severing device for severing a predetermined length of said stamp strip from said strip in response to movement of said carriage toward stamping position; an actuating member, movable between an initial position and an actuating position; means for advancing an envelope toward the stamping station and into engagement with the actuating member to drive the actuating member from its initial position to its actuating position; means linking the actuating member to the carriage in mechanical driving relationship to move the carriage from its normal position to its stamping position as the actuating member moves to actuating position; and means for moving the pressure member in the same direction as the carriage but at an accelerated rate relative to the carriage to press the severed length of the stamp strip from the carriage onto the envelope as the carriage reaches its stamping position, the driving force for operation of the carriage, the pressure member, the stamp-severing device, and the actuating member, and the timing of the recited operations, being derived directly from movement of the envelope along the conveyor with each envelope constituting a driving element coupling the conveyor thereto.

7. In a stamping machine in which envelopes or the like are advanced one-by-one through a stamping station to receive stamps, a stamp-affixing mechanism comprising: a carriage, movable between a normal position and a stamping position adjacent the stamping station; means for feeding stamps into the carriage; a moistening device, pivotally supported in the path of movement of said carriage, for moistening each stamp as it is fed into the carriage; a stamp-affixing pressure member connected to the carriage for movement with respect thereto; an actuating member, movable between an initial position and an actuating position; means for advancing an envelope toward the stamping station and into engagement with the actuating member to drive the actuating member from its initial position to its actuating position; means linking the actuating member to the carriage in mechanical driving relationship to move the carriage from its normal position to its stamping position as the actuating member moves to actuating position, said carriage engaging said moistening device and deflecting said device to an inactive position as said carriage approaches its stamping position; and means for moving the pressure member relative to the carriage to press a stamp from the carriage onto the envelope as the carriage reaches its stamping position.

8. In a stamping machine in which envelopes or the like are advanced one-by-one through a stamping station to receive stamps, a stamp-affixing mechanism comprising: a pivotally mounted carriage, movable between a normal position and a stamping position adjacent the stamping station; means for feeding stamps into the carriage; a moistening device, pivotally supported in the path of movement of said carriage, for moistening each stamp as the stamp is fed into the carriage; a stamp-affixing pressure roller connected to the carriage for movement with respect thereto; a pivotally mounted actuating lever, movable between an initial position and an actuating position; means for advancing an envelope into the stamping station and into engagement with the actuating lever to drive the actuating lever from its initial position to its actuating position; means linking the actuating lever to the carriage in mechanical driving relationship to pivot the carriage from its normal position to its stamping position as the actuating lever moves to actuating position; and means, driven by movement of the carriage, for moving the pressure roller relative to the carriage to press each stamp against the moistening device as it is fed onto the carriage and to press each stamp from the carriage onto the envelope as the carriage reaches its stamping position.

9. In a stamping machine in which envelopes or the like are advanced one-by-one through a stamping station to receive stamps, a stamp-affixing mechanism including a carriage positioned adjacent the stamping station and movable from a normal position to a stamping position, said mechanism further including an actuating member connected in mechanical driving relation to said carriage, means for feeding stamps into said carriage, and means for advancing envelopes into the stamping station and into engagement with said actuating member to drive the carriage from its normal position to its stamping position, the driving force for operation of the actuating member and the carriage, and the timing of the recited operations, being derived directly and only from movement of the envelopes along the conveyor with each envelope constituting a driving element coupling the conveyor thereto.

10. In a stamping machine in which envelopes or the like are advanced one-by-side through a stamp-feed station into a stamping station to receive stamps, a stamp-affixing mechanism including a carriage positioned adjacent the stamping station and movable from a normal position to a stamping position, and a stamp-affixing actuating member connected in mechanical driving relation to said carriage, means for feeding stamps into said carriage, a stamp-feed actuating member for controlling operation of the stamp-feed means, positioned at the stamp-feed station, and means for advancing envelopes through the stamp-feed station and the stamping station, said envelopes each engaging said actuating members to operate the stamp-feed means and to drive the stamp-affixing mechanism carriage from its normal position to its stamping position, the entire driving force for, and timing of all of the recited operations being derived directly from movement of the envelopes along the conveyor with each envelope constituting a driving element coupling the conveyor thereto.

11. In an envelope stamping machine including a stamp supply, a stamp affixing mechanism, and a conveyor for advancing envelopes along a predetermined path through the machine, a stamp feed mechanism for feeding stamps to said stamp affixing mechanism comprising: a stamp feed wheel having a peripheral stamp feed surface equal in length to an integral number of stamp lengths and further having a corresponding number of ratchet projections equally spaced around the periphery thereof; a first pawl member normally biased toward engagement with one of said ratchet projections to prevent movement of said stamp feed wheel in a given stamp-advancing directions; a second pawl member movable from a normal position effectively free of said ratchet projections toward an engaged position to impel said stamp wheel in said stamp-advancing direction; means for actuating said pawls in unison to move the stamp wheel in said stamp-advancing direction and to arrest movement thereof after said wheel has advanced one stamp length; and means comprising a cam member, extending into the path of envelope travel, for driving and controlling said actuating means, the entire driving force for the mechanism and the timing of all operations being derived directly from movement of the envelopes, each envelope constituting a driving element coupling the conveyor to said mechanism.

12. In an envelope stamping machine including a stamp supply, a stamp affixing mechanism, and a conveyor for advancing envelopes along a predetermined path through the machine, a stamp feed mechanism for feeding stamps to said stamp affixing mechanism comprising: a stamp feed wheel having a peripheral stamp feed surface equal in length to an integral number of stamp lengths and further having a corresponding number of ratchet projections equally spaced around the periphery thereof; a first pawl member normally biased toward engagement with one of said ratchet projections to prevent movement of said stamp feed wheel in a given stamp-advancing direction; a lever mounted in engagement with said first pawl member; a second pawl member mounted on said lever movable from a normal position effectively free of said ratchet projections toward an engaged position to impel said stamp wheel in said stamp-advancing direction; actuating means for moving said lever to actuate said pawls in unison and move the stamp wheel in said stamp-advancing direction and to arrest movement thereof after said wheel has advanced one stamp length; and a cam member, extending into the path of envelope travel, for controlling said actuating means.

13. In an envelope stamping machine including a stamp supply, a stamp affixing mechanism, and a conveyor for advancing envelopes along a predetermined path through the machine, a stamp feed mechanism for feeding stamps to said stamp affixing mechanism comprising: a stamp feed wheel having a peripheral stamp feed surface equal in length to an integral number of stamp lengths and further having a corresponding number of ratchet projections equally spaced around the periphery thereof; a first pawl member normally biased toward engagement with one of said ratchet projections to prevent movement of said stamp feed wheel in a given stamp-advancing direction; a second pawl member movable from a normal position effectively free of said ratchet projections toward an engaged position to impel said stamp wheel in said stamp-advancing direction; means for actuating said pawls in unison to move the stamp wheel in said stamp-advancing direction and to arrest movement thereof after said wheel has advanced one stamp length, said means including a bell crank, a linkage connecting said bell crank to said pawl members, and a driving eccentric mounted on said bell crank in engagement with the conveyor; and a cam lever, extending into the path of envelope travel and having a latch portion engaging said bell crank, for controlling said actuating means.

14. In an envelope stamping machine including a stamp supply, a stamp affixing mechanism, and a conveyor for advancing envelopes along a predetermined path through the machine, a stamp feed mechanism for feeding stamps to said stamp affixing mechanism comprising: a stamp feed wheel having a peripheral stamp feed surface; a ratchet mechanism connected to said stamp feed wheel; actuating means, driven by an envelope moving along said conveyor for actuating said ratchet mechanism to rotate the stamp wheel in a given stamp-advancing direction; means for arresting movement of said stamp wheel after said wheel has advanced precisely one stamp length; and a cam member, extending into the path of envelope travel, for controlling said actuating means directly in accordance with and in direct response to movement of said envelope along said path, each envelope constituting a driving element coupling the conveyor to said cam member.

15. A stamp feed mechanism according to claim 14, in which said actuating means includes a drive member, movable between an initial position effectively disengaged from said conveyor and an actuating position effectively engaged therewith; and a cam lever, extending into the path of envelope travel and having a latch portion engaging said drive member, for controlling said drive member.

16. A stamp feed mechanism according to claim 14, in which said cam member is a rotatable cam having a single cam surface for controlling and for directly driving said actuating means.

17. An envelope stamping machine comprising a belt conveyor for advancing envelopes along a predetermined path through the machine; an envelope spacer mechanism for spacing said envelopes from each other by a predetermined distance as they traverse said path, a stamp affixing mechanism for affixing stamps on said envelopes as said envelopes traverse said path, said stamp affixing mechanism including means for automatically moistening and thereafter severing a stamp from a continuous strip of stamps as an incident to the stamp affixing operation, and a stamp feed mechanism for feeding individual stamp lengths of a strip of stamps to said stamp affixing mechanism in co-ordination with movement of said envelopes along said path, in which all of said mechanisms are directly actuated and driven by the envelopes moving along said path, each envelope constituting a driving element coupling the conveyor to said mechanism.

18. An envelope stamping machine according to claim 17 in which said stamp affixing mechanism and said stamp feed mechanism are both actuated and driven by a single multiple-surface power cam member positioned to be engaged in frictional driving relationship by each envelope traversing a predetermined portion of said path.

19. An envelope stamping machine according to claim 18 including interrupting means for interrupting rotation of said power cam after a predetermined length of each envelope has traversed a given portion of said path to prevent multiple actuation of said mechanisms and permit acceptance of envelopes of varying length, said power cam having a high-friction envelope-engaging surface corresponding approximately to said predetermined envelope length and a low-friction envelope-engaging surface contiguous therewith to permit a further length of each envelope to slide past said power cam.

20. An envelope stamping machine according to claim 17 including means for automatically interrupting operation of said stamp feed mechanism after a predetermined length of each envelope has traversed a given portion of said path to prevent multiple actuation of said mechanism and permit acceptance of envelopes of varying length.

References Cited by the Examiner
UNITED STATES PATENTS

| | | | |
|---|---|---|---|
| 1,566,635 | 12/25 | Vidaver | 156—360 |
| 1,949,158 | 2/34 | Gay | 156—388 |
| 2,441,821 | 5/48 | Kendall | 156—252 |

EARL M. BERGERT, *Primary Examiner.*